(12) United States Patent
Becker

(10) Patent No.: US 8,144,680 B2
(45) Date of Patent: Mar. 27, 2012

(54) CONTENTION-BASED COMMUNICATIONS

(75) Inventor: Donald W. Becker, Rancho Santa Fe, CA (US)

(73) Assignee: ViaSat, Inc., Carlsbad, CA (US)

( * ) Notice: Subject to any disclaimer, the term of this patent is extended or adjusted under 35 U.S.C. 154(b) by 290 days.

(21) Appl. No.: 12/276,148

(22) Filed: Nov. 21, 2008

(65) Prior Publication Data
US 2009/0141736 A1    Jun. 4, 2009

Related U.S. Application Data

(60) Provisional application No. 60/991,638, filed on Nov. 30, 2007.

(51) Int. Cl.
*H04B 7/212* (2006.01)

(52) U.S. Cl. ........ 370/347; 370/443; 370/445; 370/458; 370/468; 370/479; 370/498; 709/226; 455/464; 455/509

(58) Field of Classification Search .................. 370/204, 370/206, 207, 314, 315, 316, 319–322, 326, 370/329–330, 335–337, 342–349, 436, 437, 370/441–445, 447, 458, 459, 277, 278, 280, 370/281, 294, 295, 414, 416, 418, 420, 461, 370/462, 468, 478–480, 498; 709/235, 236, 709/225, 226; 455/455, 463, 464, 500, 509, 455/515, 516

See application file for complete search history.

(56) References Cited

U.S. PATENT DOCUMENTS

| | | | | |
|---|---|---|---|---|
| 4,161,786 | A | * | 7/1979 | Hopkins et al. ............... 370/461 |
| 4,593,282 | A | * | 6/1986 | Acampora et al. ............ 370/447 |
| 4,774,707 | A | | 9/1988 | Raychaudhuri |
| 4,901,307 | A | | 2/1990 | Gilhousen et al. |
| 5,172,375 | A | * | 12/1992 | Kou .............................. 370/322 |
| 5,239,677 | A | | 8/1993 | Jasinski |
| 5,465,253 | A | * | 11/1995 | Rahnema ...................... 370/349 |

(Continued)

FOREIGN PATENT DOCUMENTS

EP    0282028 A1    9/1988

(Continued)

OTHER PUBLICATIONS

"IEEE Standard for Local and Metropolitan Area Networks, Part 16: Air Interface for Fixed Broadband Wireless Access Systems-Amendment 2: Medium Access Control Modifications and Additional Physical Layer Specifications for 2-11 GHz," IEEE Std 802.16a™ Apr. 1, 2003, 318 pages, New York, New York. .

(Continued)

*Primary Examiner* — Jeffrey M Rutkowski
(74) *Attorney, Agent, or Firm* — Kilpatrick Townsend & Stockton LLP

(57) ABSTRACT

Methods and apparatus are presented for conducting communications using a shared communication medium. A message is sent over the shared communication medium. The shared communication medium is organized to include an allocation of node identification signal space and an allocation of data transmission signal space. The allocation of node identification signal space includes a plurality of node identification segments. The allocation of data transmission signal space includes a data transmission segment. The message includes a node identification portion and a data transmission portion. The node identification portion is transmitted in the allocation of node identification signal space and occupies a node identification segment. The data transmission portion is transmitted in the allocation of node identification signal space and occupies the data transmission segment.

26 Claims, 12 Drawing Sheets

U.S. PATENT DOCUMENTS

| | | | |
|---|---|---|---|
| 5,530,842 A * | 6/1996 | Abraham et al. | 370/445 |
| 5,570,355 A * | 10/1996 | Dail et al. | 370/442 |
| 5,592,469 A | 1/1997 | Szabo | |
| 5,644,576 A * | 7/1997 | Bauchot et al. | 370/437 |
| 5,669,062 A | 9/1997 | Olds et al. | |
| 5,737,335 A | 4/1998 | Mizuta et al. | |
| 5,790,535 A * | 8/1998 | Kou | 370/346 |
| 5,809,060 A | 9/1998 | Cafarella et al. | |
| 5,859,879 A | 1/1999 | Bolgiano et al. | |
| 6,034,967 A | 3/2000 | Citta et al. | |
| 6,252,885 B1 * | 6/2001 | Yashiro et al. | 370/443 |
| 6,332,006 B1 | 12/2001 | Rydbeck et al. | |
| 6,366,568 B1 | 4/2002 | Bolgiano et al. | |
| 6,510,149 B1 * | 1/2003 | Amtmann | 370/345 |
| 6,563,808 B1 | 5/2003 | Cox et al. | |
| 6,567,661 B2 | 5/2003 | McDonnell et al. | |
| 6,584,101 B2 | 6/2003 | Hagglund et al. | |
| 6,590,885 B1 | 7/2003 | Jorgensen | |
| 6,671,269 B1 * | 12/2003 | Ueno et al. | 370/347 |
| 6,677,864 B2 | 1/2004 | Khayrallah | |
| 6,680,929 B1 | 1/2004 | Lida et al. | |
| 6,717,934 B1 * | 4/2004 | Kaasila et al. | 370/347 |
| 6,735,217 B1 * | 5/2004 | Webber et al. | 370/447 |
| 6,738,350 B1 | 5/2004 | Gao et al. | |
| 6,760,591 B1 | 7/2004 | Klinger | |
| 6,778,515 B2 | 8/2004 | Bolgiano et al. | |
| 6,785,251 B2 | 8/2004 | Bolgiano et al. | |
| 6,804,207 B2 | 10/2004 | Bolgiano et al. | |
| 6,842,444 B2 | 1/2005 | Bolgiano et al. | |
| 6,847,626 B1 | 1/2005 | Carneal et al. | |
| 6,889,032 B2 | 5/2005 | Dao et al. | |
| 6,985,455 B1 | 1/2006 | Heath et al. | |
| 6,990,478 B2 | 1/2006 | Loy et al. | |
| 7,024,582 B2 | 4/2006 | Loy et al. | |
| 7,072,894 B2 | 7/2006 | Loy et al. | |
| 7,111,291 B2 | 9/2006 | Loy et al. | |
| 7,120,650 B2 | 10/2006 | Loy et al. | |
| 7,143,131 B1 | 11/2006 | Soles et al. | |
| 7,177,321 B2 * | 2/2007 | Bae | 370/447 |
| 7,187,669 B1 | 3/2007 | Lee | |
| 7,260,064 B2 | 8/2007 | Basu et al. | |
| 7,330,487 B2 | 2/2008 | Chang et al. | |
| 7,369,526 B2 | 5/2008 | Lechleider et al. | |
| 7,370,116 B2 | 5/2008 | Chan et al. | |
| 7,440,404 B2 | 10/2008 | Nagesh et al. | |
| 7,450,914 B2 | 11/2008 | Valdivia et al. | |
| 7,463,608 B2 | 12/2008 | Bolgiano et al. | |
| 7,471,932 B2 | 12/2008 | Wu et al. | |
| 7,486,643 B2 | 2/2009 | Czaja et al. | |
| 7,515,566 B2 | 4/2009 | Dale et al. | |
| 7,529,221 B2 | 5/2009 | Czaja et al. | |
| 7,554,964 B2 | 6/2009 | Bolgiano et al. | |
| 7,606,531 B2 | 10/2009 | Asai et al. | |
| 7,620,010 B2 | 11/2009 | Takeda et al. | |
| 7,657,455 B2 | 2/2010 | Sachdev et al. | |
| 7,657,628 B1 | 2/2010 | McDysan et al. | |
| 7,738,859 B2 | 6/2010 | Roy et al. | |
| 7,746,784 B2 | 6/2010 | de Heer | |
| 2001/0045494 A1 | 11/2001 | Higgins | |
| 2002/0026523 A1 * | 2/2002 | Mallory et al. | 709/236 |
| 2002/0077141 A1 | 6/2002 | Hwang et al. | |
| 2002/0080816 A1 | 6/2002 | Spinar et al. | |
| 2002/0110102 A1 | 8/2002 | Wei et al. | |
| 2002/0126711 A1 | 9/2002 | Robinett et al. | |
| 2002/0131376 A1 | 9/2002 | Wheatley | |
| 2002/0136276 A1 | 9/2002 | Franceschini | |
| 2002/0167960 A1 * | 11/2002 | Garcia-Luna-Aceves | 370/442 |
| 2002/0186678 A1 * | 12/2002 | Averbuch et al. | 370/347 |
| 2003/0016692 A1 * | 1/2003 | Thomas et al. | 370/442 |
| 2003/0083095 A1 | 5/2003 | Liang | |
| 2003/0128687 A1 | 7/2003 | Worfolk et al. | |
| 2003/0147411 A1 | 8/2003 | Goosman | |
| 2003/0207684 A1 | 11/2003 | Wesel | |
| 2003/0223409 A1 | 12/2003 | Wiebe | |
| 2004/0136334 A1 | 7/2004 | Heiman et al. | |
| 2004/0142658 A1 | 7/2004 | McKenna et al. | |
| 2004/0162099 A1 | 8/2004 | Chen et al. | |
| 2004/0184473 A1 * | 9/2004 | Tavli et al. | 370/445 |
| 2004/0218577 A1 | 11/2004 | Nguyen et al. | |
| 2004/0233867 A1 | 11/2004 | Wheatley | |
| 2005/0009529 A1 | 1/2005 | Chen et al. | |
| 2005/0021802 A1 | 1/2005 | Chen et al. | |
| 2005/0025219 A1 | 2/2005 | Rice | |
| 2005/0030931 A1 | 2/2005 | Sung et al. | |
| 2005/0058135 A1 | 3/2005 | Sisto et al. | |
| 2005/0122999 A1 | 6/2005 | Scherzer et al. | |
| 2005/0233710 A1 | 10/2005 | Lakkis et al. | |
| 2006/0013181 A1 | 1/2006 | Stolpman et al. | |
| 2006/0050664 A1 | 3/2006 | Guey | |
| 2006/0104301 A1 * | 5/2006 | Beyer et al. | 370/445 |
| 2006/0110162 A1 | 5/2006 | Tian et al. | |
| 2006/0153283 A1 | 7/2006 | Scharf et al. | |
| 2007/0004415 A1 | 1/2007 | Abedi | |
| 2007/0021117 A1 | 1/2007 | McKenna | |
| 2007/0025398 A1 | 2/2007 | Yonge, III et al. | |
| 2007/0030834 A1 | 2/2007 | Rappaport | |
| 2007/0047499 A1 | 3/2007 | Montojo | |
| 2007/0070908 A1 | 3/2007 | Ghosh et al. | |
| 2007/0111760 A1 | 5/2007 | Hovers et al. | |
| 2007/0189404 A1 | 8/2007 | Baum et al. | |
| 2008/0075033 A1 | 3/2008 | Shattil | |
| 2008/0076432 A1 | 3/2008 | Senarath et al. | |
| 2008/0095121 A1 | 4/2008 | Shattil | |
| 2008/0108361 A1 | 5/2008 | Ylanen et al. | |
| 2008/0146177 A1 | 6/2008 | Hwang et al. | |
| 2008/0186855 A1 | 8/2008 | Becker | |
| 2008/0186856 A1 | 8/2008 | Becker | |
| 2008/0186857 A1 | 8/2008 | Becker | |
| 2008/0186859 A1 | 8/2008 | Becker | |
| 2008/0186860 A1 | 8/2008 | Becker | |
| 2008/0186861 A1 | 8/2008 | Becker | |
| 2008/0186940 A1 | 8/2008 | Becker | |
| 2008/0186975 A1 | 8/2008 | Becker | |
| 2008/0186994 A1 | 8/2008 | Becker | |
| 2008/0186997 A1 | 8/2008 | Becker | |
| 2008/0187002 A1 | 8/2008 | Becker | |
| 2008/0187003 A1 | 8/2008 | Becker | |
| 2008/0212524 A1 | 9/2008 | Niwano | |
| 2008/0219211 A1 | 9/2008 | Franceschini | |
| 2008/0219220 A1 | 9/2008 | Gerakoulis | |
| 2008/0304506 A1 | 12/2008 | Becker | |
| 2008/0304507 A1 | 12/2008 | Irvine | |
| 2009/0080375 A1 | 3/2009 | Jalil et al. | |
| 2009/0129334 A1 | 5/2009 | Ma et al. | |
| 2009/0141680 A1 | 6/2009 | Becker | |
| 2011/0026472 A1 * | 2/2011 | Reumerman et al. | 370/329 |

FOREIGN PATENT DOCUMENTS

| | | | |
|---|---|---|---|
| EP | 0680168 A | | 11/1995 |
| EP | 0917317 A | | 5/1999 |
| EP | 1526655 A3 | | 4/2005 |
| EP | 1909526 A | | 4/2008 |
| JP | 2003-169164 A | | 6/2003 |
| WO | WO 93/15573 A | | 8/1993 |
| WO | WO 2004/054221 A1 | | 6/2004 |
| WO | WO 2007/055249 A2 | | 5/2007 |

OTHER PUBLICATIONS

"IEEE Standard for Local and Metropolitan Area Networks, Part 16: Air Interface for Fixed Broadband Wireless Access Systems," IEEE, May 29, 2009; 864 pages, New York, New York.

"IEEE Standard for Local and Metropolitan Area Networks, Part 16: Air Interface for Fixed Broadband Wireless Access Systems, Amendment 2: Physical and Medium Access Control Layers for Combined Fixed and Mobile Operation in Licensed Bands and Corrigendum 1," IEEE, Feb. 28, 2006, 864 pages, New York, New York. .

Non-Final Office Action for U.S. Appl. No. 11/771,762 mailed on Oct. 16, 2009; 21 pages.

Non-Final Office Action for U.S. Appl. No. 11/771,840 mailed on Oct. 22, 2009; 22 pages.

Notice of Allowance for U.S. Appl. No. 11/771,856 mailed on Dec. 15, 2009; 4 pages.

Notice of Allowance for U.S. Appl. No. 11/771,870 mailed on Dec. 23, 2009; 4 pages.

Final Office Action for U.S. Appl. No. 11/771,882 mailed on Dec. 8, 2009; 30 pages.
Final Office Action for U.S. Appl. No. 11/771,894 mailed on Jan. 12, 2010; 36 pages.
Final Office Action for U.S. Appl. No. 11/771,903 mailed on Jan. 5, 2010; 33 pages.
Final Office Action for U.S. Appl. No. 11/771,910 mailed on Dec. 8, 2009; 19 pages.
Non-Final Office Action for U.S. Appl. No. 11/771,926 mailed on Nov. 27, 2009; 29 pages.
Final Office Action for U.S. Appl. No. 11/771,762 mailed on Feb. 5, 2010; 20 pages.
Final Office Action for U.S. Appl. No. 11/771,798 mailed on Jan. 25, 2010; 33 pages.
Final Office Action for U.S. Appl. No. 11/771,810 mailed on Jan. 27, 2010; 30 pages.
Final Office Action for U.S. Appl. No. 11/771,828 mailed on Jan. 22, 2010; 35 page.
Supplemental Notice of Allowability for U.S. Appl. No. 11/771,856 mailed on Feb. 12, 2010; 6 pages.
Supplemental Notice of Allowability for U.S. Appl. No. 11/771,856 mailed on Mar. 10, 2010; 2 pages.
Supplemental Notice of Allowability of U.S. Appl. No. 11/771,870 mailed on Feb. 12, 2010; 2 pages.
Supplemental Notice of Allowability of U.S. Appl. No. 11/771,870 mailed on Mar. 10, 2010; 2 pages.
Advisory Action for U.S. Appl. No. 11/771,882 mailed on Mar. 22, 2010; 5 pages.
Advisory Action for U.S. Appl. No. 11/771,903 mailed on Mar. 11, 2010; 3 pages.
Advisory Action for U.S. Appl. No. 11/771,910 mailed on Mar. 8, 2010; 5 pages.
Advisory Action for U.S. Appl. No. 11/771,798 mailed on Apr. 13, 2010; 3 pages.
Advisory Action for U.S. Appl. No. 11/771,810 mailed on Apr. 15, 2010; 3 pages.
Advisory Action for U.S. Appl. No. 11/771,828 mailed on Apr. 9, 2010; 3 pages.
Non-Final Office Action for U.S. Appl. No. 11/771,828 mailed on May 24, 2010; 24 pages.
Notice of Allowance for U.S. Appl. No. 11/771,840 mailed on Apr. 19, 2010 ; 16 pages.
Advisory Action for U.S. Appl. No. 11/771,894 mailed on Apr. 1, 2010; 3 pages.
Final Office Action for U.S. Appl. No. 11/771,926 mailed May 19, 2010; 18 pages.
"Distributed Bandwith Request and Allocation in Multi-Hop Relay" IEEE 802.16 Broadband Wireless Access Working Group; Jan. 8, 2007; 8 pages.
Asgarkhani et al; "Simulation Studies of Mixed Traffic on Satellite Channels Using TDMA-Reservation Protocol" Proceeding of the Annual International Phoenix Conference on Computers and Communications; Mar. 22, 1989; pp. 195-200; Washington, US.
Chan M.C. B. et al "A Dynamic Reservation Protocol for LEO Mobile Satellite Systems" IEEE Journal on Selected Areas in Communications, Apr. 1, 2004, pp. 559-573, vol. 22, No. 3.
Chitre et al; "Random Access with Notification—A New Multiple-Access Scheme for VSAT Networks" Comsat Technical Review, Mar. 21, 1989; pp. 99-12; vol. 19 No. 1; Communications Satellite Corporation; Washington US.
Ghosh et al; "Random Access Design for UMTS Air-Interface Evolution;" IEEE 65$^{th}$ Vehicular Technology Conference; pp. 1041-1045; Apr. 1, 2007.
Haberle H. et al, "G2-Combinations of Frequency, Time and Space Division Multiple Access in Multitransponder Satellite Communications"; pp. 432-440, Nov. 1, 1972.
Hideto et al, "A Wavelet Packet Modulation Method for Satellite Communications," Nov. 1, 2005 pp. 1-5.
"Orthonogal Pilot Channel Structure in E-UTRA Uplink;" TSG-RANAD HOC LTE; Jan. 25, 2006; pp. 1-8; Section 2-4.
"Random Access Burst Design for E-UTRA;" Panasonic, NTT DoCoMo; TSG-RAW WG1 Meeting #46; Aug. 28, 2006; pp. 1-9; Section 2-3; Tallinn, Estonia.
Tallal O; "Mac Architecture for Broadband satellite access system" Apr. 20, 2000 at URL http///users.encs.concordia.ca/{tahar/theses/Tallal-Thesis.pdf,.
PCT Written Opinion of the International Searching Authority for Application No. PCT/US/2008/053199; mailed Jul. 18, 2008; pp. 11.
PCT Search Report of the International Searching Authority for Application No. PCT/US/2008/053199 mailed on Jul. 18, 2008 pp. 4.
PCT Written Opinion of the International Searching Authority for Application No. PCT/US/2008/053200; mailed Jul. 18, 2008; pp. 10.
PCT Search Report of the International Searching Authority for Application No. PCT/US/2008/053200; mailed on Jul. 18, 2008 pp. 4.
PCT Search Report of the International Searching Authority for Application No. PCT/US/2008/053205; mailed on Jul. 18, 2008; pp. 4.
PCT Written Opinion of the International Searching Authority for Application No. PCT/US2008/053205; mailed Jul. 18, 2008; pp. 10.
PCT Search Report of the International Searching Authority for Application No. PCT/US/2008/053208; mailed on Jul. 18, 2008; pp. 4.
PCT Written Opinion of the International Searching Authority for Application No. PCT/US2008/053208; mailed Jul. 18, 2008; pp. 10.
PCT Written Opinion of the International Searching Authority for Application No. PC/US/2008/053210; mailed on Sep. 15, 2008; pp. 9.
PCT Search Report of the International Searching Authority for Application No. PCT/US/2008/053210; mailed on Sep. 15, 2008 pp. 6.
PCT Search Report of the International Searching Authority for Application No. PCT/US/2008/066360; mailed on Jun. 9, 2008; pp. 3.
PCT Written Opinion of the International Searching Authority for Application No. PCT/US/2008/066360; mailed on Jun. 9, 2008; pp. 8.
PCT Search Report of the International Searching Authority for Application No. PCT/US/2008/066361; mailed on Jun. 9, 2008; pp. 4.
PCT Written Opinion of the International Searching Authority for Application No. PCT/US/2008/066361; mailed on Jun. 9, 2008; pp. 7.
PCT Search Report of the International Searching Authority for Application No. PCT/US/2008/57672; mailed on Jun. 23, 2008; pp. 7.
PCT Written Opinion of the International Searching Authority for Application No. PCT/US/2008/57672; mailed on Jun. 23, 2008 pp. 3.
PCT Search Report of the International Searching Authority for Application No. PCT/US/2008/084574; mailed on Jan. 28, 2009; pp. 2.
PCT Written Opinion of the International Searching Authority for Application No. PCT/ US/2008/084574; mailed on Jan. 28, pp. 7.
PCT Search Report of the International Searching Authority for Application No. PCT/US/2008/084577; mailed on Feb. 5, 2009; pp. 2.
PCT Written Opinion of the International Searching Authority for Application No. PCT/US/2008/084577; mailed on Feb. 5, 2009; pp. 7.
Non-Final Office Action for U.S. Appl. No. 11/771,910; mailed on Jun. 18, 2009; pp. 17.
Non-Final Office Action for U.S. Appl. No. 11/771,882; mailed on Jun. 22, 2009; pp. 22.
Non-Final Office Action for U.S. Appl. No. 11/771,856; mailed on Jul. 8, 2009; pp. 7.
Non-Final Office Action for U.S. Appl. No. 11/771,870; mailed on Jul. 8, 2009; pp. 10.
Non-Final Office Action for U.S. Appl. No. 11/771,810; mailed on Jul. 21, 2009; pp. 18.
Kawamura et al., Orthogonal Pilot Channel Using Combination of FDMA and CDMA in Single-Carrier FDMA-Based Evolved UTRA Uplink, IEEE, mar. 11-15, 2007, 2405-2410.
Non-Final Office Action for U.S. Appl. No. 11/771,894; mailed on Jul. 23, 2009; 26 pages.
Non-Final Office Action for U.S. Appl. No. 11/771,828 mailed on Jul. 24, 2009; 21 pages.

Non-Final Office Action for U.S. Appl. No. 11/771,798 mailed on Jul. 24, 2009; 22 pages.
Non-Final Office Action for U.S. Appl. No. 11/771,903 mailed on Jul. 31, 2009; 24 pages.
Non-Final Office Action for U.S. Appl. No. 11/771,910 mailed on Dec. 1, 2010; 23 pages.
Supplemental Notice of Allowability for U.S. Appl. No. 11/771,926 mailed on Sep. 17, 2010; 16 pages.
Advisory Action for U.S. Appl. No. 11/771,828 mailed on Nov. 22, 2010; 5 pages.
Non-Final Office Action for U.S. Appl. No. 12/134,637 mailed on Jul. 12, 2010; 31 pages.
Non-Final Office Action for U.S. Appl. No. 12/134,868 mailed on Aug. 5, 2010; 23 pages.
Final Office Action for U.S. Appl. No. 11/771,828 mailed on Sep. 8, 2010; 13 pages.
Notice of Allowance for U.S. Appl. No. 11/771,926 mailed on Aug. 9, 2010; 17 pages.
International Preliminary Report on Patentability for PCT Application No. PCT/US2008/066360 mailed on Dec. 23, 2009; 8 pages.
International Preliminary Report on Patentability for PCT Application No. PCT/US2008/066361 mailed on Dec. 23, 2009; 7 pages.
Notice of Allowance for U.S. Appl. No. 12/134,637 mailed on Mar. 14, 2011 18 pages.
Notice of Allowance for U.S. Appl. No. 12/134,868 mailed on Feb. 3, 2011, 14 pages.
Notice of Allowance of Jul. 21, 2011 for U.S. Appl. No. 11/771,910, 11 pages.

* cited by examiner

CONTENTION-BASED COMMUNICATIONS

CROSS-REFERENCES TO RELATED APPLICATIONS

The present application claims benefit of priority under 35 U.S.C. 119(e) of U.S. Provisional Application No. 60/991,638, filed on Nov. 30, 2007, entitled "Improved Contention-Based Communications," the content of which is incorporated herein by reference in its entirety.

BACKGROUND OF THE INVENTION

In many applications, a communication medium is shared among a number of nodes. The nodes compete with one another for access to the shared communication medium. At any given moment, there may be more than one of the nodes that wish to transmit data over the shared communication medium. A system is typically put in place to facilitate access to the shared communication medium by the nodes. Various categories of such multiple access systems have been developed.

One category of multiple access systems utilizes contention protocols. Examples of these contention protocols include the ALOHA protocol and the slotted ALOHA protocol, which are known in the art. Here, each node is allowed to freely transmit its data over the shared communication medium at any time or any slotted time. In a system employing a hub, each node sends its transmission to the hub, which then broadcasts the transmission to all of the nodes. In a system without a hub, each node directly broadcasts its transmission to all of the nodes. In either case, every node listens to the channel for its own transmission and attempts to receive it. If a node is unsuccessful in receiving its own transmission, the node can assume that its transmission was involved in a collision with another transmission, and the node simply re-transmits its data after waiting a random amount of time. In this manner, collisions are allowed to occur but are resolved by the nodes.

Another category of multiple access systems utilizes carrier sense protocols. Examples include persistent carrier sense multiple access protocols (persistent CSMA) and non-persistent carrier sense multiple access protocols (non-persistent CSMA), which are known in the art. Generally speaking, these protocols require each node to listen to the shared communication medium before transmitting. Only if the shared communication medium is available is the node allowed to transmit its data. In persistent CSMA, when a node senses that the shared communication medium is not available, the node continually listens to the shared communication medium and attempts to transmit as soon as the medium becomes available. In non-persistent CSMA, when a node senses that the shared communication medium is not available, the node waits an amount of time before attempting to listen to the shared communication channel for an opportunity to transmit. Even though a node listens first before transmitting, there still exists a probability for a collision. This is because when the medium is available, two or more nodes can detect the availability and decide that they are going to transmit data. Various techniques have been developed to handle such collisions.

Yet another category of multiple access systems utilizes contention free protocols. Here, each node can reserve the shared communication medium in order to transmit its data. The node can transmit data without colliding with transmissions from other nodes. This is because the shared communication medium is reserved, for a particular time duration for example, for the node's transmission and not for any other transmission. However, contention free protocols require a reservation process that allows the nodes to reserve use of the shared communication medium. Collisions during the reservation process can lead to collisions during subsequent data transmissions.

Thus, methods and systems for use of a shared communication medium are needed that provide improved detection and resolution of collisions between data transmissions from competing nodes.

SUMMARY OF THE INVENTION

The present invention relates to methods and apparatus for communicating using a shared communication medium. A message is sent over the shared communication medium. The shared communication medium is organized to include an allocation of node identification signal space and an allocation of data transmission signal space. The allocation of node identification signal space includes a plurality of node identification segments each having a different location within the allocation of node identification signal space. The allocation of data transmission signal space includes a data transmission segment. The message includes a node identification portion and a data transmission portion. The node identification portion is transmitted in the allocation of node identification signal space and occupies a node identification segment that is one of the plurality of node identification segments. The node identification segment is associated with an access node. The data transmission portion is transmitted in the allocation of data transmission signal space and occupies the data transmission segment. The data transmission segment is capable of being occupied by data transmission portions of other messages transmitted from other access nodes. A measure of occupancy of the shared communication medium is based on a number of occupied node identification segments detected in the allocation of node identification signal space. Depending on the measure of occupancy of the shared communication medium, the data transmission portion in the allocation of data transmission signal space is processed.

In one embodiment, the allocation of node identification signal space is organized according to a code division multiplexing (CDM) technique using a plurality of code words. The node identification portion is transmitted using a code word that is one of the plurality of code words.

In another embodiment, if one occupied node identification segment is detected in the allocation of node identification signal space, the data transmission portion in the allocation of data transmission signal space is processed.

In another embodiment, if two or more occupied node identification segments are detected in the allocation of node identification signal space, the data transmission portion in the allocation of data transmission signal space is not processed.

In yet another embodiment, the access node is associated with more than one node identification segment in the allocation of node identification signal space.

The present invention further relates to other methods and apparatus for communicating using a shared communication medium. A message is received from an access node over the shared communication medium. The shared communication medium is organized to include an allocation of node identification signal space and an allocation of data transmission signal space. The allocation of node identification signal space includes a plurality of node identification segments each having a different location within the allocation of node identification signal space. The allocation of data transmission signal space includes a data transmission segment. The message includes a node identification portion and a data transmission portion. The node identification portion is transmitted in the allocation of node identification signal space and occupies a node identification segment that is one of the plurality of node identification segments. The node identification segment is associated with the access node. The data transmission portion is transmitted in the allocation of data transmission signal space and occupies the data transmission segment. The data transmission segment is capable of being occupied by data transmission portions of other messages transmitted from other access nodes. A measure of occupancy of the shared communication medium is determined based on a number of occupied node identification segments detected in the allocation of node identification signal space. Depending on the measure of occupancy of the shared communication medium, the data transmission portion in the allocation of data transmission signal space is processed.

DETAILED DESCRIPTION OF THE INVENTION

The present invention relates to contention-based communications conducted over a shared communication medium involving a plurality of nodes. The invention is specifically related to techniques employed for detecting and resolving collisions that occur between transmissions from competing nodes.

The present invention may be implemented as part of a medium access control (MAC) protocol. Alternatively, the present invention may be implemented as part of any other protocol or technique that manages use of a shared communication medium, including those that involve scheduling or reservation request functions.

Figure 1:
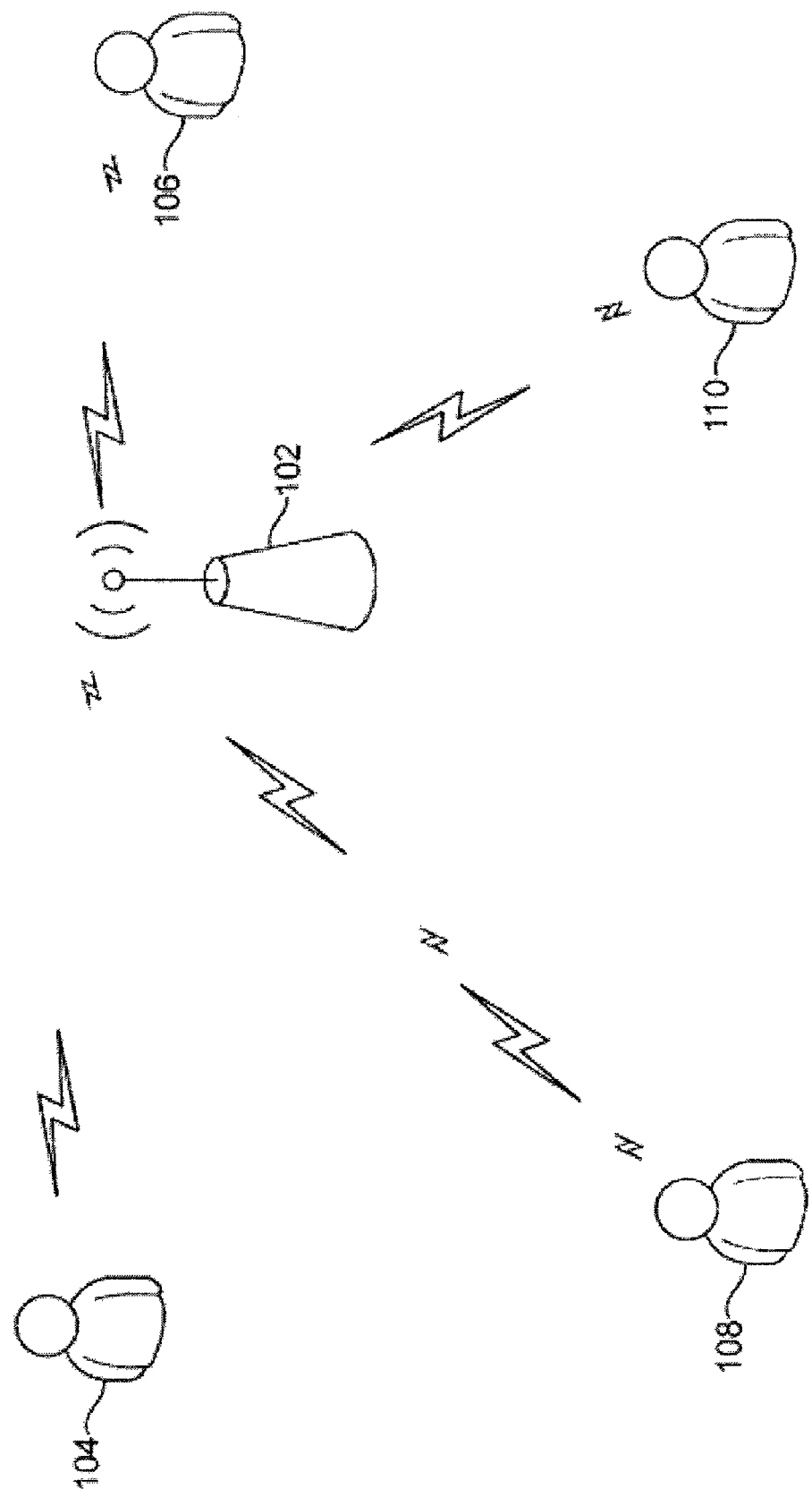
FIG. 1 presents a simplified network including hub 102 and a plurality of access nodes 104, 106, 108, and 110 utilizing a shared communication medium.

FIG. 1 presents a simplified network including hub 102 and a plurality of access nodes 104, 106, 108, and 110 utilizing a shared communication medium. The shared communication medium can represent any communication medium that may be utilized by more than one node. For example, the shared communication medium can represent signal space in one or more satellite channels. Thus, the access nodes and the hub may be part of a satellite network. As another example, the shared communication medium can represent signal space in one or more wireless terrestrial channels. Thus, the access nodes and the hub may be part of a terrestrial wireless network. As yet another example, the shared communication medium can represent signal space in one or more wired channels. Thus, the access nodes and hub may be part of a wired network.

Furthermore, embodiments of the present invention are not restricted to a particular form of communication medium, but may be implemented in systems using electromagnetic channels, optical channels, acoustic channels, or others. Additionally, embodiments of the present invention may be implemented in different network topologies that involve a shared communication medium. These may include star topologies, mesh topologies, bus topologies, and others.

According to various embodiments of the invention, the shared communication medium utilized by access nodes 104, 106, 108, and 110 may be organized into a node identification signal space and a data transmission signal space. The node identification signal space may be organized into a plurality of node identification segments. Each node identification segment is associated with an access node. Thus, each access node, such as access nodes 104, 106, 108, and 110, is associated with a unique node identification segment.

According to some embodiments of the invention, the access nodes may be assigned to unique node identification segments randomly or based on some predetermined criteria. Additionally, the assignment of node identification segments may be periodically changed or randomized. As an example, the assignments may be periodically changed so that active access nodes are assigned to node identification segments in different frames. This may be useful, for example, to reduce collision probability.

The data transmission signal space may be used by access nodes 104, 106, 108, and 110 to transmit data. In some embodiments, the data comprises a request for bandwidth in a subsequent frame. The data transmission signal space may be organized into a plurality of data transmission segments. Each data transmission segment generally refers to a portion of the data transmission signal space that may be used for sending a data transmission.

According to an embodiment of the invention, hub 102 serves to manage use of the shared communication medium by access nodes 104, 106, 108, and 110. In order to transmit data over the shared communication medium, an access node sends a message to hub 102. A message includes a node identification portion and a data transmission portion. The node identification portion occupies the node identification segment associated with the access node and serves to identify the access node sending the message. The data transmission portion occupies a corresponding data transmission segment. In some embodiments, the data transmission segment is utilized on a contention basis and is thus subject to use by other nodes. However, because each node identification segment is associated with a single access node, node identification segments are not subject to use by other nodes. Thus, hub 102 is able to determine which access node sent a message by determining which node identification segment is occupied.

Hub 102 is also able to determine when a collision has occurred. In some embodiments, if more than one node identification segment is occupied, then hub 102 determines that a collision has occurred between the data transmissions corresponding to the occupied node identification segments. In this case, hub 102 may assign an opportunity for a data transmission in a subsequent data transmission segment to each access node involved in the collision. In some embodiments, the access nodes may be assigned data transmission segments of different sizes depending on, for example, which access nodes were involved in the collision. Hub 102 sends an assignment message associated with the assignments to the access nodes. Upon receiving the assignment, each access node can transmit data in the assigned data transmission segment. Each access node is assigned a different data transmission segment that is reserved for that node's data transmission only. The assigned data transmission segments are no longer available for use on a contention basis, but are reserved for the data transmission of the assigned node. Thus, communication opportunities using assigned data transmission segments are collision-free, and collisions are efficiently resolved in one roundtrip.

Alternatively, in other embodiments hub 102 may allow each access node involved in a collision to re-transmit the data in subsequent frames.

This general scheme of detecting collisions and assigning subsequent data transmission opportunities to resolve collisions is used in various embodiments of the invention. However, other embodiments of the invention may involve variations and different operations.

Figure 2:
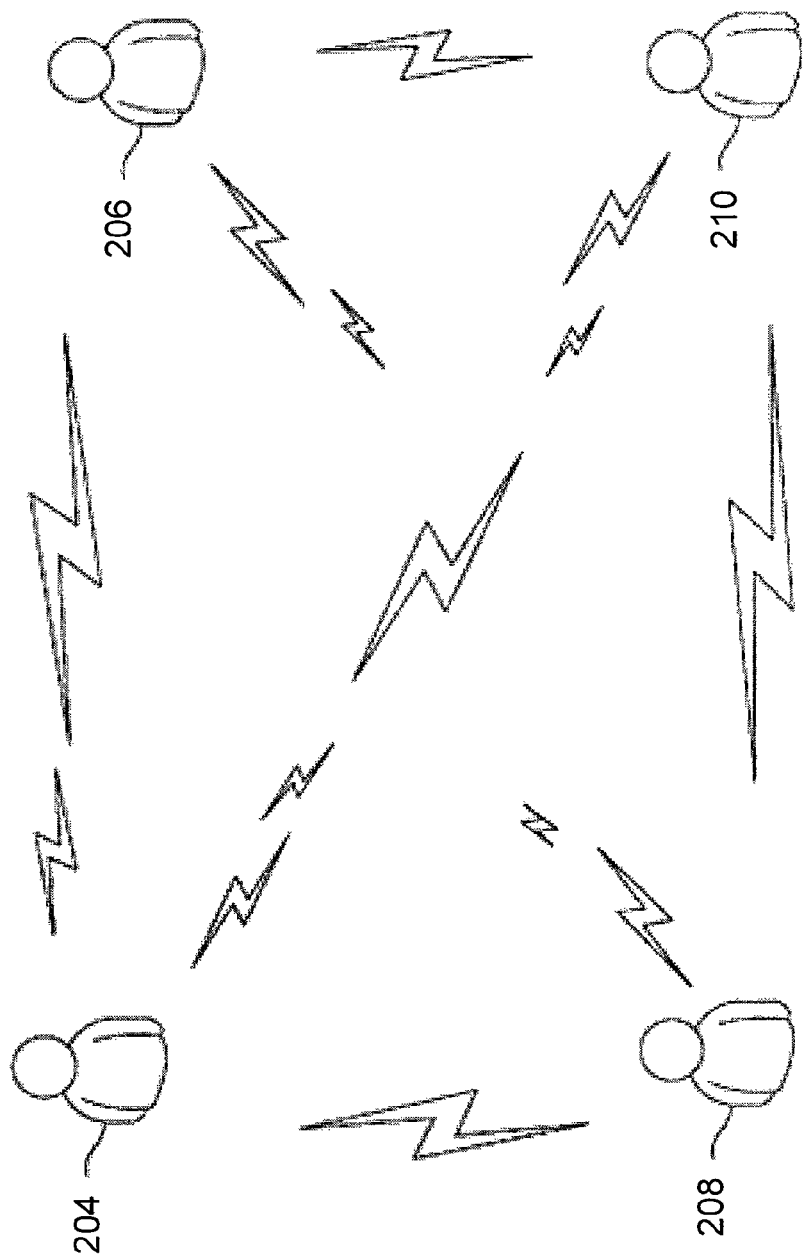
FIG. 2 presents a simplified network operating under a "no hub mode."

As an example, FIG. 2 presents a simplified network operating under a "no hub mode." A plurality of access nodes 204, 206, 208, and 210 are shown utilizing a shared communication medium. Instead of depending on a hub to receive messages and determine if collisions have occurred, each access node independently makes a determination as to whether a message has been involved in a collision. Here, it is assumed that all access nodes can detect all messages, and all access nodes follow the same rules for determining when a collision has occurred. If this is the case, then the same determination will be generated at each access node. That is, each access node will independently determine that a collision has occurred when more than one node identification segment is occupied. As such, there would be no need for a dedicated hub. Also, there would be no need for a subsequent assignment message to be sent if each access node is able to locally determine the proper assignment of subsequent data transmission segments based on predetermined rules.

Symbols

Generally speaking, a basic unit of data transmission is referred to here as a "symbol." A symbol can be defined to have one out of a number of possible values. For example, a binary symbol may have one of two possible values, such as "0" and "1." Thus, a sequence of N binary symbols may convey $2^N$ possible messages. More generally speaking, an M-ary symbol may have M possible values. Thus, a sequence of N M-ary symbols may convey $M^N$ possible messages.

The concept of a symbol and the methods by which a symbol can assume values is quite general. In many applications, a symbol is associated with a defined baseband pulse shape which is up-converted to a carrier frequency with a particular phase relationship to the carrier and with a particular amplitude. The amplitude and/or phase of the symbol is known as the modulation and carries the information of a symbol. The set of permissible modulation points defined in the amplitude and phase plane is known as the modulation constellation. The amount of information that a symbol may convey is related to the number of discrete points of the constellation. 16-QAM is an example of an amplitude-phase constellation which allows transmission of up to 4 bits of information per symbol. In some applications, only the phase is used for modulation. Quadra-phase shift keying (QPSK) is an example of pure phase modulation which allows transmission of up to 2 bits of information per symbol. In other applications, the symbol waveform may be defined such that symbol phase may either not exist or be difficult to receive accurately, in which case pure amplitude modulation can be used. One example of binary amplitude modulation is on-off amplitude-shift keying modulation which allows transmission of up to 1 bit of information per symbol.

Each symbol may occupy a particular portion of the relevant signal space. Specifically, each symbol may be said to occupy a certain amount of "time-bandwidth product." Here, an amount of time-bandwidth product is a scalar quantity that may be measured in units of Hz-seconds and does not necessarily dictate how the signal is distributed within the signal space. In theory, symbols cannot be strictly limited in both time and frequency. It is customary, however, to define the time-bandwidth product of a signal to be the time-bandwidth product of the region in which the preponderance of signal energy resides. Since precise definitions of time-bandwidth product vary somewhat throughout the literature, the figures showing symbol boundaries in time-frequency space should be considered as approximate representations.

Just as a simple example, a signal spanning a bandwidth of 1 Hz and lasting a duration of 1 second may have a time-bandwidth product of 1 Hz-second. A signal spanning a bandwidth of 0.5 Hz and lasting a duration of 2 seconds may also have a time-bandwidth product of 1 Hz-second. Similarly, a signal spanning a bandwidth of 0.1 Hz and lasting a duration of 10 seconds may also have a time-bandwidth product of 1 Hz-second. These examples do not assume any multiplexing of the signal space, which is discussed separately below. Also, the particular values used in these example and other examples described herein are for illustrative purpose only. Different values may be used in actual systems.

The measurement of a symbol in terms of an amount of time-bandwidth product is also applicable when different signal space multiplexing techniques are employed. Such techniques may include time-division multiplexing, frequency-division multiplexing, wavelet-division multiplexing, code-division multiplexing, and/or others. In each of the following four examples, a symbol occupies a time-bandwidth product of 1 Hz-second, even though different signal space multiplexing techniques are used.

Figure 3:
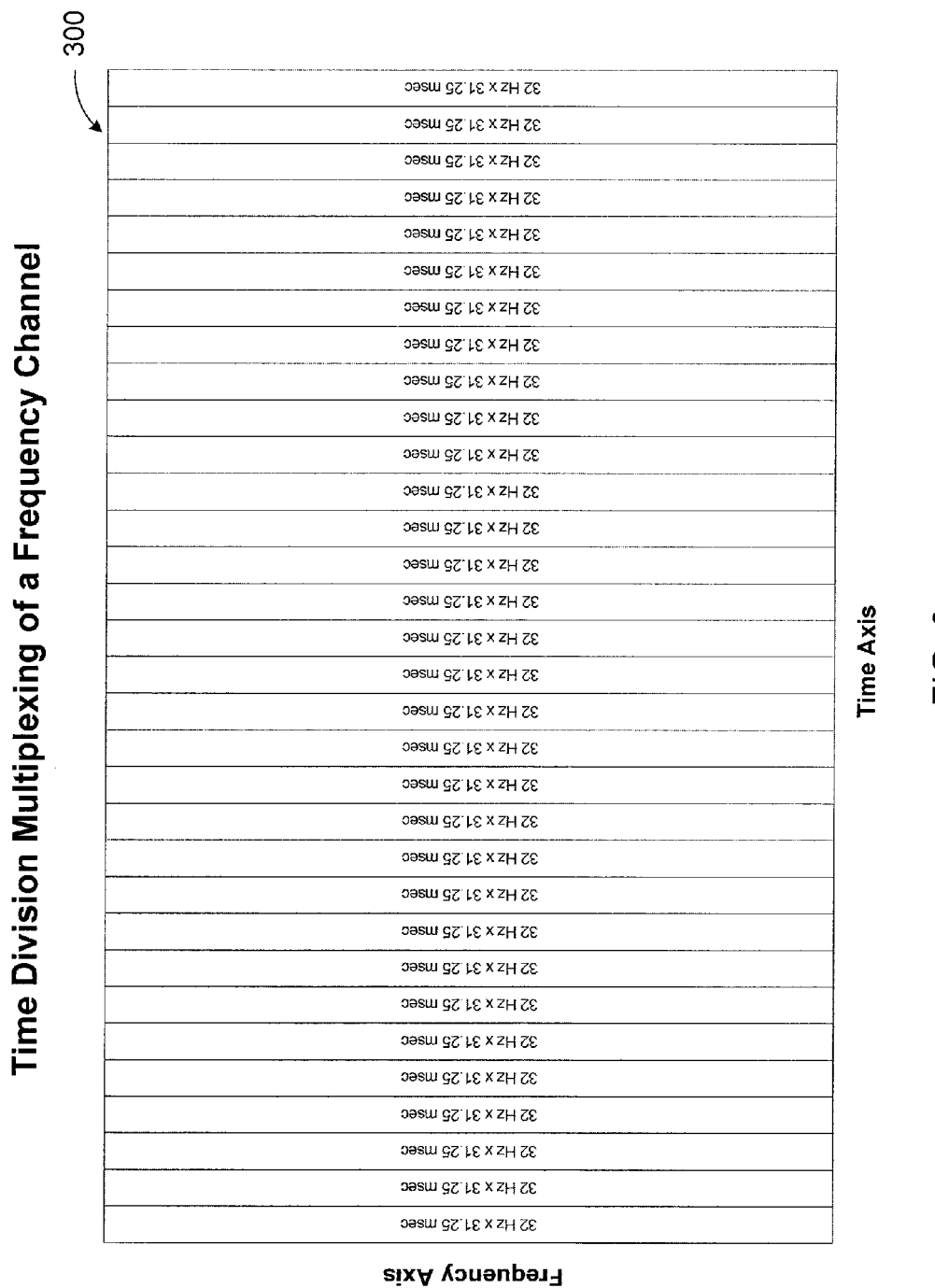
FIG. 3 depicts a time division multiplexing scheme as applied to a frequency channel having a bandwidth of 32 Hz over a duration of 1 second.

In a first example, FIG. 3 depicts a time-division multiplexing scheme as applied to a frequency channel 300 having a bandwidth of 32 Hz over a duration of 1 second. The channel is divided into 32 time slots, each having a duration of $\frac{1}{32}$ second. A symbol may be transmitted in each $\frac{1}{32}$-second time slot over the bandwidth of 32 Hz. In this example, each symbol has a time-bandwidth product of 1 Hz-second.

Figure 4:
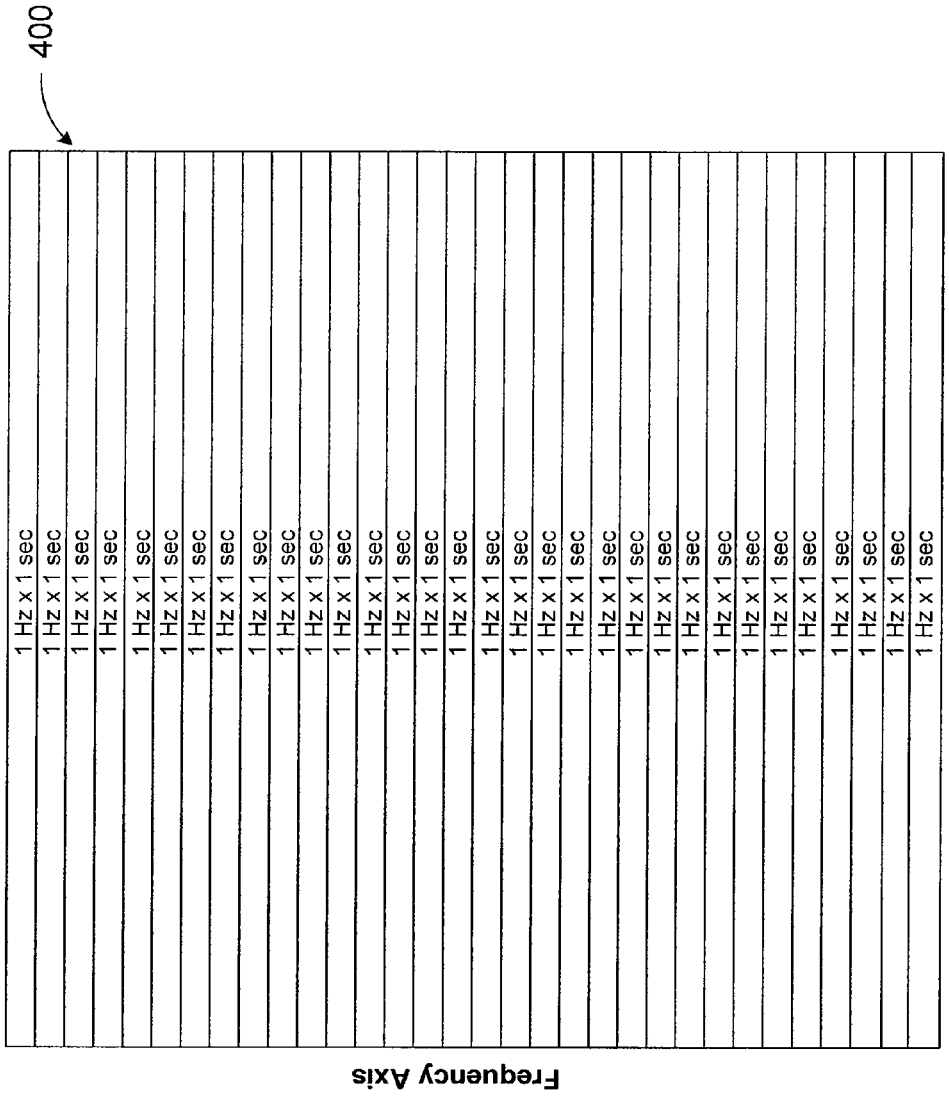
FIG. 4 depicts a frequency division multiplexing scheme as applied to a frequency channel having a bandwidth of 32 Hz over a duration of 1 second.

In a second example, FIG. 4 depicts a frequency division multiplexing scheme as applied to a frequency channel 400 having a bandwidth of 32 Hz over a duration of 1 second. The channel is divided into 32 different frequency sub-channels each having a bandwidth of 1 Hz. A symbol may be transmitted in each 1 Hz frequency sub-channel over the duration of 1 second. In this example, each symbol also has a time-bandwidth product of 1 Hz-second.

Figure 5:
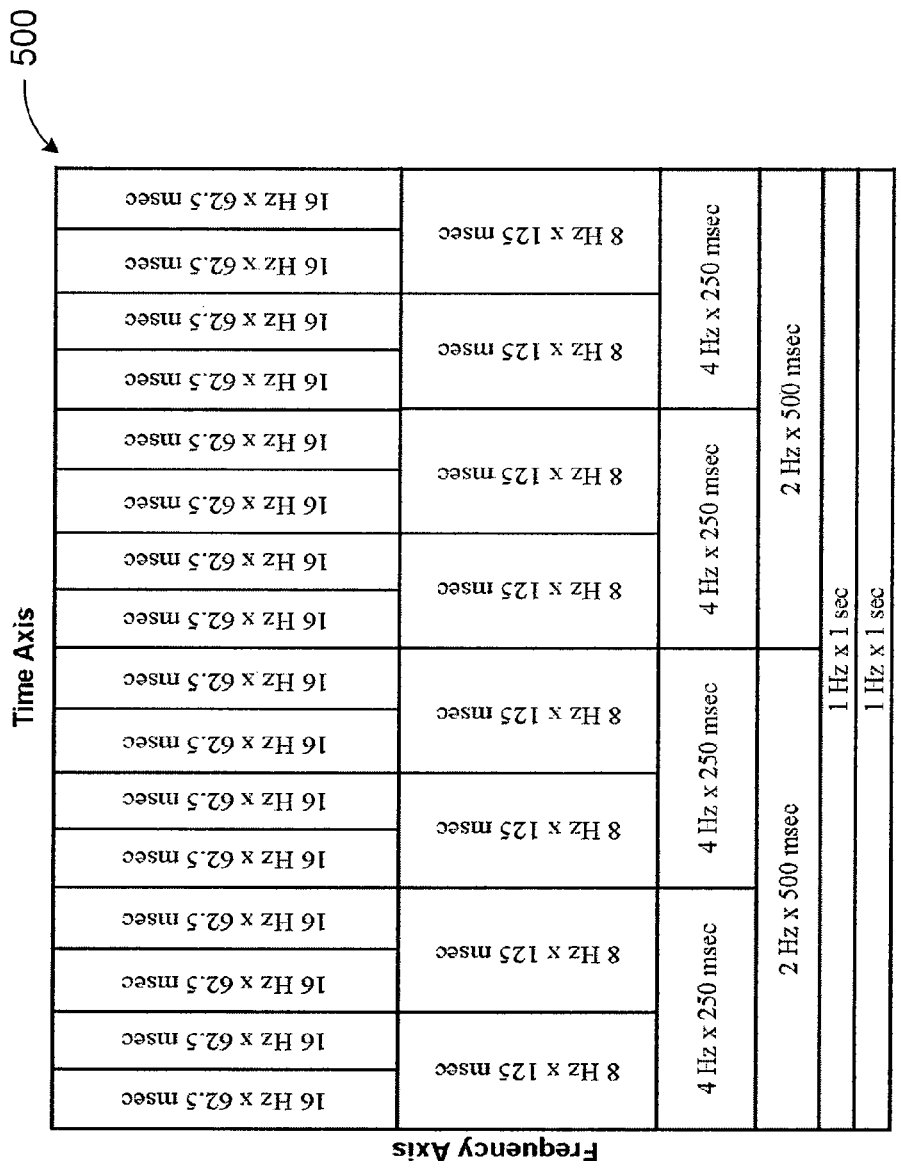
FIG. 5 depicts a wavelet division multiplexing scheme as applied to a frequency channel having a bandwidth of 32 Hz over a duration of 1 second.

In a third example, FIG. 5 depicts a wavelet-division multiplexing scheme as applied to a frequency channel 500 having a bandwidth of 32 Hz over a duration of 1 second. The channel is divided into 32 different time and frequency symbol segments. 2 symbol segments have a bandwidth of 1 Hz with a duration of 1 second, 2 other symbol segments have a bandwidth of 2 Hz with a duration of $\frac{1}{2}$ second, 4 other symbol segments have a bandwidth of 4 Hz with a duration of $\frac{1}{4}$ second, 8 other symbol segments have a bandwidth of 8 Hz with a duration of $\frac{1}{8}$ second, and 16 additional symbol segments have a bandwidth of 16 Hz with a duration of $\frac{1}{16}$ second. In this example, each symbol has a time-frequency product of 1 Hz-second.

In a fourth example, a code-division multiplexing scheme is applied to a frequency channel having a bandwidth of 32 Hz over a duration of 1 second. For this example, it is assumed that there are 32 different possible orthogonal code words, each comprising a unique 32-chip binary pattern. Each code word represents a unique "code channel." To send a symbol on a particular code channel, the symbol value is used to modulate the code word associated with the code channel, and the resulting signal is sent. In the case of binary phase shift keying (BPSK) symbols, for instance, a symbol having a value of "1" may be sent by simply sending the code word, and a symbol having a value of "0" may be sent by sending the inverted version (180-degree phase shift) of the code word. The 32 symbols sent using 32 different "code channels" are non-interfering, and as a group, they occupy a common 32 Hz by 1 second portion of the time-frequency space. In this example, each symbol has an effective time-frequency product of 1 Hz-second.

Symbol-Level Node Identification Segments

According to an embodiment of the present invention, each node identification segment may be occupied by a symbol-level identifier. Here, a symbol-level identifier refers to an identifier that can be sent in the form of a transmission signal having a time-bandwidth product comparable to that of a symbol. For example, a symbol-level identifier may occupy exactly one symbol. Thus, a protocol message comprising a large number of symbols, representing a header and a data payload that must be processed and interpreted, would not be considered a symbol-level identifier.

The novel use of a symbol-level identifier according to embodiments of the present invention allows for highly efficient utilization of the available signal space. Because of its compact size, a symbol-level identifier may not have sufficient capacity to carry a significant data payload. However, according to various embodiments of the invention, each access node is associated with a unique node identification segment. Thus, the existence of a symbol-level identifier occupying a node identification segment conveys important information about the access node that is transmitting data. This information may be used to detect and resolve collisions that occur between data transmissions from competing nodes.

Node Identification Signal Space and Data Transmission Signal Space

In accordance with the invention, the node identification signal space, as well as the data transmission signal space, may be organized based on various multiplexing techniques. Thus, the plurality of node identification segments in the node identification signal space may represent allotments defined based on one or more types of multiplexing techniques. As mentioned previously, these may include time-division multiplexing, frequency-division multiplexing, wavelet-division multiplexing, code-division multiplexing, and/or other multiplexing techniques. Similarly, the plurality of data transmission segments may represent allotments defined based on one or more types of multiplexing techniques applied to the data transmission signal space.

As such, each node identification segment may have a different "location" within the node identification signal space. For example, if the node identification signal space is organized according to a time-division multiplexing technique, each node identification segment may comprise a different time slot in the node identification signal space. Here, each particular node identification segment is said to correspond to a different location (in time) in the node identification signal space. The same concept can be applied to a node identification signal space organized according to a frequency-division multiplexing technique. In such a case, each node identification segment may comprise a particular frequency sub-channel and be said to correspond to a different location (in frequency) in the node identification signal space. The same concept can be applied to a node identification signal space organized according to a code-division multiplexing technique. In such a case, each node identification segment may comprise a particular code word and be said to correspond to a different location (in code space) in the node identification signal space. Similarly, the concept can be applied to a node identification signal space organized according to a combination of different multiplexing techniques, such as a combination of time-division multiplexing and frequency-division multiplexing techniques. In this particular example, each node identification segment may comprises a particular time slot in a particular frequency sub-channel and be said to correspond to a different location (in time and frequency) in the node identification signal space.

Also, the separation between the node identification signal space and the data transmission signal space may be based on different multiplexing techniques. In one embodiment, time-division multiplexing is employed. For example, the node identification signal space and the data transmission signal space may be defined over different time slots and a common frequency range. In another embodiment, frequency-division multiplexing is employed. For example, the node identification signal space and the data transmission signal space may be defined over a common time duration and different frequency ranges. In yet another embodiment, code-division multiplexing is employed. For example, the node identification signal space and the data transmission signal space may be defined over a common time duration and a common frequency range, but use different code words.

Feedback Signal Space

According to some embodiments of the invention, a feedback signal space may be utilized for sending assignment messages from hub 102 to access nodes 104, 106, 108, and 110. Assignment messages may be sent to the access nodes that are involved in collisions to assign subsequent data transmission opportunities. In some embodiments, the feedback signal space is not a part of the shared communication medium. Using a satellite system as an example, the feedback signal space may be implemented as a satellite "forward-link" that allows signals to be sent from hub 102 to access nodes 104, 106, 108, and 110. This satellite "forward-link" may be separate from a "return-link" that allows signals to be sent from access nodes 104, 106, 108, and 110 to hub 102.

The present invention broadly covers detecting and resolving collisions between messages that are sent over a shared communication medium. The various combinations of node identification signal space and data transmission signal space described below are presented for illustrative purposes and are not intended to restrict the scope of the invention. In some examples, a feedback signal space is explicitly shown along with the node identification signal space and the data transmission signal space.

Figure 6:
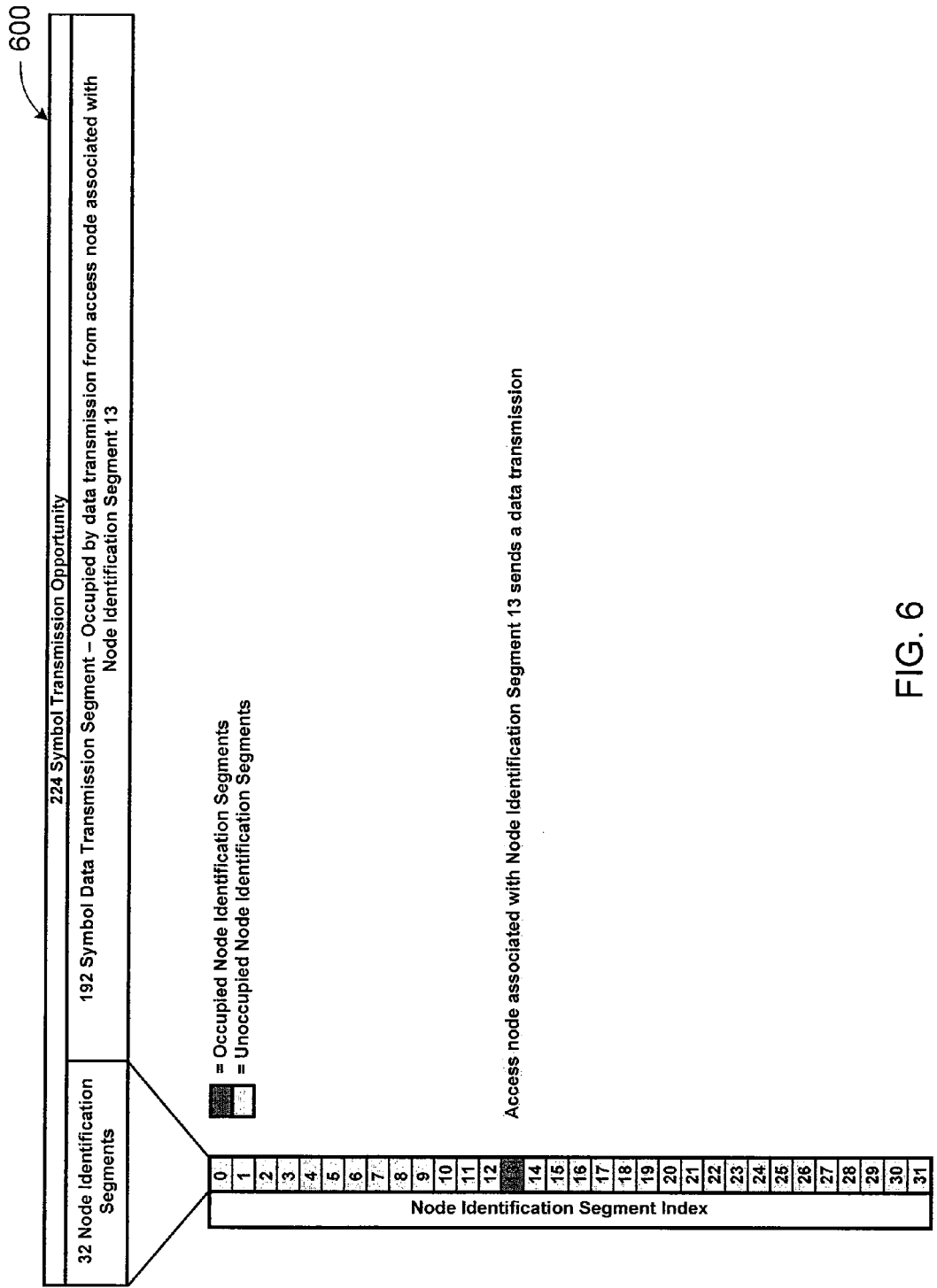
FIG. 6 is an illustrative signal diagram showing a shared communication medium that includes an allocation of node identification signal space with collision-free node identification segments, and an allocation of data transmission signal space with a contention-based data transmission segment, according to an embodiment of the invention.

In the figures below, only a representative portion of the relevant signal space is shown. For example, if one frame of a signal is shown, it should be understood that more frames may be used even though they are not explicitly illustrated. Also, the particular sizes and proportions of the various signal space designs are provided as mere examples. For example, FIG. 6 shows shared communication medium 600 that represents a 224 symbol transmission opportunity. The 224 symbol transmission opportunity includes node identification segments comprising 32 symbols and a data transmission segment comprising 192 symbols. The size of the transmission opportunity as well as the size and number of node identification segments and data transmission segments are provided as mere examples.

Collision-Free Node Identification Segments with a Contention-Based Data Transmission Segment FIG. 6 is an illustrative signal diagram showing a shared communication medium 600 that includes an allocation of node identification signal space with collision-free node identification segments, and an allocation of data transmission signal space with a contention-based data transmission segment, according to an embodiment of the invention. FIG. 6 presents shared communication medium 600 organized as one continuous sequence of symbols. The node identification signal space and the data transmission signal space may be organized based on various multiplexing techniques. Thus, the symbols shown in FIG. 6 may be organized based on time division multiplexing, frequency division multiplexing, wavelet-division multiplexing, code division multiplexing, and/or other multiplexing techniques.

The sequence of symbols may be organized into "frames." For ease of illustration, FIG. 6 presents only a single frame. Other frames may follow. It should be understood that a frame represents a single sequence of symbols that are transmitted sequentially. For example, the frame shown in FIG. 6 represents a 224 symbol transmission opportunity. The sequence of symbols is arranged in time as follows: node identification segments 0-31 (labeled as Node Identification Segment Indices 0-31) followed by a single 192-symbol data transmission segment. Other frames are structured in a similar manner.

Embodiments of the invention that utilize time division multiplexing (TDM) to partition the node identification signal space and the data transmission signal space may use TDM node identification segments and TDM data transmission segments. In this case, shared communication medium 600 is organized as one continuous sequence of TDM time slots. For example, shared communication medium 600 may comprise a particular frequency channel. Each TDM time slot occupies the entire bandwidth of the frequency channel, but only for a specific time duration. In this case, the first 32 time slots of the frame illustrated in FIG. 6 are considered 32 node identification segments. The next 192 time slots are considered one data transmission segment, made up of 192 symbols. Thus, a message sent from an access node, such as access nodes 104, 106, 108, and 110, to hub 102 would occupy the node identification segment associated with the access node and the corresponding data transmission segment.

As another example, embodiments of the invention utilizing TDM to partition the node identification signal space and the data transmission signal space may use a code division multiplexing (CDM) technique to organize the node identification segments. Here, the 32 node identification segments are organized as a 32-chip node identification interval. Merely by way of example, a 32-chip Walsh CDMA code may be used. In the code space shown in FIG. 6, there exists 32 different possible code words. Node Identification Segment Indices 0-31 are used to identify the 32 different possible code words. Thus, a message sent from an access node, such as access nodes 104, 106, 108, and 110, to hub 102 would include the code word associated with the access node and the corresponding data transmission segment. Other types and lengths of code may be used in accordance with the invention. For example, Sparse Walsh Codes, Gold Codes, Loosely Synchronous (LS) Codes, and others.

FIG. 6 shows the following types of node identification segments: (1) Occupied Node Identification Segments and (2) Unoccupied Node Identification Segments. In this example, only Node Identification Segment 13 is occupied by a symbol-level identifier, indicating that the access node associated with Node Identification Segment 13 has sent a message to hub 102. As mentioned previously, each access node is associated with a unique node identification segment. Because each access node is associated with a unique node identification segment, no collisions will occur between symbol-level identifiers that are sent by different access nodes at the same time. Thus, the node identification segments are collision-free.

Data transmissions are contention-based since only one data transmission segment exists per frame in the example of FIG. 6. If more than one access node sends a message in a particular frame, a collision will occur between the corresponding data transmissions. However, in the example of FIG. 6, there is only one message sent to hub 102, and thus no collisions have occurred.

Merely by way of example, the message shown in FIG. 6 may be sent as follows. Access node 108 may be associated with Node Identification Segment 13. Because Node Identification Segment 13 is occupied in this example, hub 102 determines that access node 108 has sent a message. Because no other access nodes have sent messages in this frame, hub 102 determines that no collisions have occurred.

Assignment of Subsequent Data Transmission Segments Following Collisions

Figure 7:
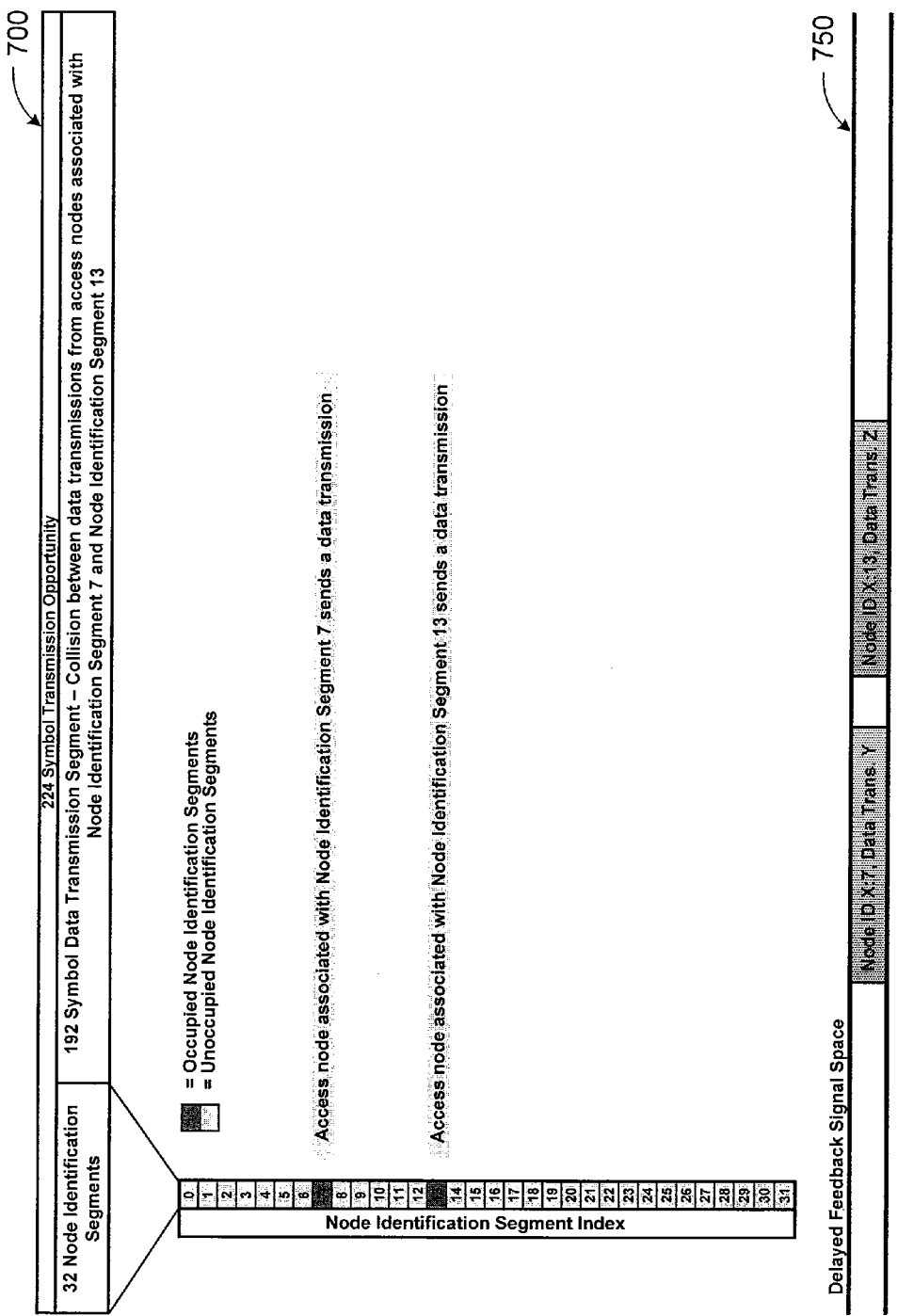
FIG. 7 is an illustrative signal diagram showing a shared communication medium that includes an allocation of node identification signal space with collision-free node identification segments, an allocation of data transmission signal space with a contention-based data transmission segment, and a delayed feedback signal space, according to an embodiment of the invention.

FIG. 7 is an illustrative signal diagram showing a shared communication medium 700 that includes an allocation of node identification signal space with collision-free node identification segments, an allocation of data transmission signal space with a contention-based data transmission segment, and a delayed feedback signal space, according to an embodiment of the invention. The figure shows a representation of shared communication medium 700 that includes a node identification signal space and a data transmission signal space. Shared communication medium 700 is organized in a manner similar to shared communication medium 600 discussed previously. Separately, FIG. 7 shows feedback signal space 750.

FIG. 7 shows the following types of node identification segments: (1) Occupied Node Identification Segments and (2) Unoccupied Node Identification Segments. In the example of FIG. 7, Node Identification Segment 7 and Node Identification Segment 13 are both occupied by symbol-level identifiers. This indicates that the access node associated with Node Identification Segment 7 and the access node associated Node Identification Segment 13 both sent messages to hub 102 in the frame illustrated.

As mentioned previously, each access node is associated with a unique node identification segment. This ensures that no collisions will occur between symbol-level identifiers from different access nodes. However, data transmissions are contention-based. Only one data transmission segment exists per frame. Thus, in the example of FIG. 7, a collision will occur between the data transmissions from the access node associated with Node Identification Segment 7 and the access node associated with Node Identification Segment 13.

As a result of the collision, hub 102 assigns subsequent data transmission segments to the access nodes involved in the collision. Hub 102 sends an assignment message to the access nodes. Upon receiving the assignments, the access nodes can transmit data in the assigned data transmission segments. Thus, embodiments of the present invention provide effective detection and efficient resolution of collisions.

Merely by way of example, the messages shown in FIG. 7 may be sent as follows. Access node 106 may be associated with Node Identification Segment 7, and access node 108 may be associated with Node Identification Segment 13. Because Node Identification Segment 7 and Node Identification Segment 13 are both occupied, hub 102 determines that a collision has occurred between the data transmissions from these access nodes. As a result, in some embodiments hub 102 assigns different opportunities for subsequent data transmissions to access node 106 and access node 108. Hub 102 sends an assignment message to the access nodes in feedback signal space 750. Upon receiving the assignments, the access nodes can transmit data in the assigned data transmission segments.

FIG. 7 depicts assignment messages in feedback signal space 750 that explicitly include: (1) an identifier of the access node and (2) an identifier of the assigned subsequent data transmission segment. In other words, the pairing of an access node to a subsequent data transmission segment is directly stated in the assignment message. For example, as shown in FIG. 7, the first assignment message includes "Node ID X:7, Data Trans. Y." This indicates that the message sent in Frame X by the access node associated with Node Identification Segment 7 (Node ID X:7) has been assigned the data transmission segment in subsequent Frame Y (Data Trans. Y). Here, Frame X represents the frame illustrated in FIG. 7, and Frame Y represents a subsequent frame with a data transmission segment that is available for assignment. The second assignment message includes "Node ID X:13, Data Trans. Z." This indicates that the message sent in Frame X by the access node associated with Node Identification Segment 13 has been assigned the data transmission segment in subsequent Frame Z (Data Trans. Z). Here, Frame Z represents a subsequent frame, different from Frame Y, that also has a data transmission segment that is available for assignment. Because Frames Y and Z have been assigned to Node Identification Segments 7 and 13, respectively, the data transmission segments in these frames are not available for contention-based communications.

According to an embodiment of the invention, each access node maintains a transmission queue, which includes the frames in which the data transmission segment has been assigned to a particular access node for data transmission. Only the assigned access node can send a data transmission in these frames. Other access nodes wishing to send a message must wait for a data transmission segment in an "unassigned" frame.

In FIG. 7, feedback signal space 750 is labeled as "Delayed Feedback Signal Space." In this particular embodiment of the invention, an assignment message sent in feedback signal space 750 may be delayed in the sense that it may not be received by the access nodes until some time after (perhaps multiple frames after) a collision is detected.

Multiple Node Identification Segments Associated with Each Access Node

Figure 8:
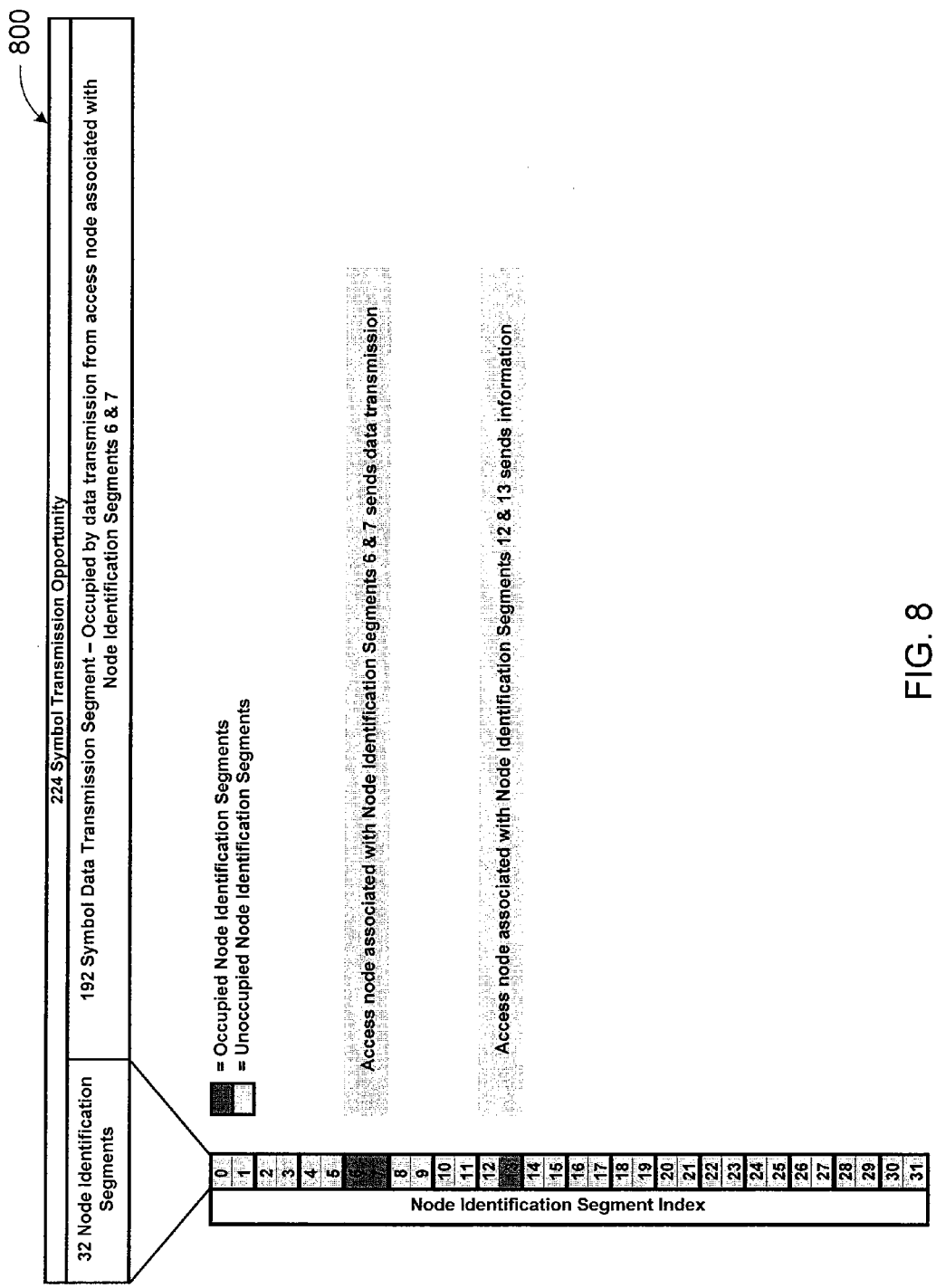
FIG. 8 is an illustrative signal diagram showing a shared communication medium that includes an allocation of node identification signal space with multiple collision-free node identification segments associated with each access node, and an allocation of data transmission signal space with a contention-based data transmission segment, according to an embodiment of the invention.

FIG. 8 is an illustrative signal diagram showing a shared communication medium 800 that includes an allocation of node identification signal space with multiple collision-free node identification segments associated with each access node, and an allocation of data transmission signal space with a contention-based data transmission segment, according to an embodiment of the invention. In this example, each access node is associated with a pair of node identification segments.

Similar to FIGS. 6 and 7, shared communication medium 800 is organized as one continuous sequence of symbols in a single frame. The frame shown in FIG. 8 represents a 224 symbol transmission opportunity. The sequence of symbols is arranged in time as follows: node identification segments 0-31 (labeled as Node Identification Segment Indices 0-31) followed by a single 192-symbol data transmission segment. Other frames are structured in a similar manner. The node identification signal space and the data transmission signal space may be organized based on various multiplexing techniques, as discussed previously.

FIG. 8 shows the following types of node identification segments: (1) Occupied Node Identification Segments and (2) Unoccupied Node Identification Segments. In this embodiment, each access node is associated with two node identification segments. For example, Node Identification Segments 0 and 1 are associated with a single access node, Node Identification Segments 2 and 3 are associated with a different access node, Node Identification Segments 4 and 5 are associated with yet a different access node, and so on for each pair of node identification segments.

In the example of FIG. 8, Node Identification Segments 6 & 7 are occupied by symbol-level identifiers, and Node Identification Segment 13 is occupied by a symbol-level identifier. This indicates that the access node associated with Node Identification Segments 6 & 7 has sent a transmission to hub 102, and the access node associated with Node Identification Segments 12 & 13 has sent a transmission to hub 102.

Associating two node identification segments with each access node provides a means for the access nodes to relay information to hub 102 in a relatively compact format. For example, two node identification segments can support four signal codes [(1,1), (1,0), (0,1), (0,0)]. Here, one signal code can be used, for example, to indicate that the access node has sent a data transmission, while the other signal codes can be used for other purposes.

As an example, one of the other signal codes may be used as a request to reserve a subsequent data transmission segment. An access node may send a request to reserve a subsequent data transmission segment if, for example, the access node determines that a probability of collision is high based on the number of messages being sent from other access nodes. Hub 102 receives the request and assigns an opportunity for a subsequent data transmission. Hub 102 sends an assignment message to the access node in a feedback signal space (not shown). Upon receiving the assignment, the access node can transmit data collision-free in the assigned data transmission segment.

In some embodiments of the invention, the other signal codes may be used to send other information to hub 102. For example, the signal codes may be used for adaptive coding and modulation (ACM) to report the conditions of the access node to hub 102. Using ACM, each message may be transmitted at an optimized modulation and coding (modcode) level given the conditions of the destination node. The signal codes may also be used to send estimated signal to noise ratio (SNR), estimated return power level, bit error rate, or any other communication link parameter. Here, the existence of a symbol-level identifier occupying a node identification segment is used to convey information to hub 102.

Merely by way of example, the transmissions shown in FIG. 8 may be sent as follows. Access node 106 may be associated with Node Identification Segments 6 & 7, and access node 108 may be associated with Node Identification Segments 12 & 13. For this example, it is assumed that an access node indicates that it has sent a message to hub 102 by sending symbol-level identifiers occupying both node identification segments associated with the access node. The access node indicates that it has sent other information (as discussed above) to hub 102 by sending a symbol-level identifier that occupies only one of the node identification segments associated with the access node. In the example of FIG. 8, Node Identification Segments 6 & 7 are both occupied, indicating that access node 106 has sent a message to hub 102. Node Identification Segment 13 is also occupied, indicating that access node 108 has sent other information to hub 102. Because only access node 106 has sent a message to hub 102, no collision has occurred between data transmissions from access node 106 and access node 108. This is because the message sent by access node 106 occupies Node Identification Segments 6 & 7 and the data transmission segment. The information sent by access node 108 occupies only Node Identification Segment 13. Node 108 is able to send the information to hub 102 without using the data transmission segment.

It is to be understood that the example of FIG. 8 is provided for illustrative purposes only. For ease of illustration, each access node in FIG. 8 is associated with a pair of node identification segments. Alternatively, each access node may be associated with a single node identification segment, where each node identification segment can be occupied by a symbol-level identifier that supports transmission of more than two values per symbol. Each value may represent a different signal code. Other embodiments of the invention may involve variations and different operations.

Multiple Data Transmission Segments

Figure 9:
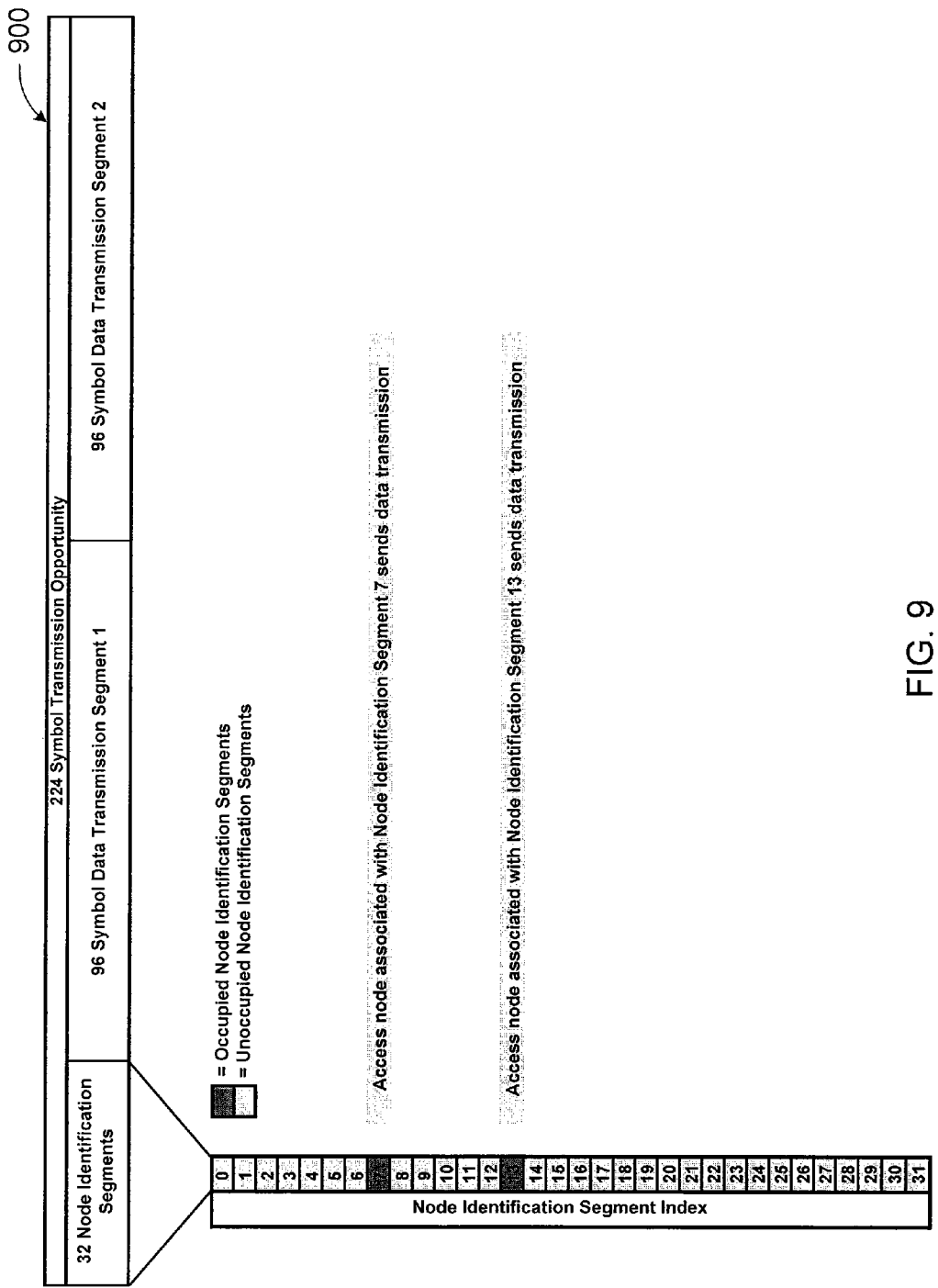
FIG. 9 is an illustrative signal diagram showing a shared communication medium that includes an allocation of node identification signal space with collision-free node identification segments, and an allocation of data transmission signal space with multiple contention-based data transmission segments, according to an embodiment of the invention.

FIG. 9 is an illustrative signal diagram showing a shared communication medium 900 that includes an allocation of node identification signal space with collision-free node identification segments, and an allocation of data transmission signal space with multiple contention-based data transmission segments, according to an embodiment of the invention.

Similar to the previous examples, shared communication medium 900 is organized as one continuous sequence of symbols in a single frame. The frame shown in FIG. 9 represents a 224 symbol transmission opportunity. The sequence of symbols is arranged in time as follows: node identification segments 0-31 (labeled as Node Identification Segment Indices 0-31) followed by two 96-symbol data transmission segments (labeled as Data Transmission Segment 1 and Data Transmission Segment 2). Other frames may follow and are structured in a similar manner. The node identification signal space and the data transmission signal space may be organized based on various multiplexing techniques, as discussed previously.

FIG. 9 shows the following types of node identification segments: (1) Occupied Node Identification Segments and (2) Unoccupied Node Identification Segments. As discussed in regard to the embodiment of FIG. 8, each node identification segment may be occupied by a symbol-level identifier that supports transmission of more than two values per symbol. Each value may represent a different signal code. Alternatively, each access node may be associated with more than one node identification segment, as illustrated in the example of FIG. 8.

Further, in the example of FIG. 9, each frame includes two data transmission segments. In this example, Node Identification Segment 7 and Node Identification Segment 13 are both occupied by symbol-level identifiers. This indicates that the access nodes associated with these node identification segments have sent transmissions to hub 102.

In this example, multiple data transmission segments can be used to reduce the probability of collision between data transmissions from competing nodes. For example, an access node may send a contention-based data transmission in either of the data transmission segments. The data transmission segment used by the access node may be chosen randomly, based on some predetermined criteria, or assigned. Alternatively, the access node may choose to send a data transmission that occupies both of the data transmission segments.

If more than one node identification segment is occupied, hub 102 determines which data transmission segments are occupied to determine if a collision has occurred. If one of the data transmission segments is occupied by more than one data transmission, hub 102 determines that a collision has occurred.

Alternatively, if symbol-level identifiers are used that support transmission of more than two values per symbol, different signal codes may be used to indicate which data transmission segment is occupied. For example, one signal code may be used to indicate that a data transmission has been sent in Data Transmission Segment 1, another signal code may be used to indicate that a data transmission has been sent in Data Transmission Segment 2, and yet another signal code may be used to indicate that a data transmission has been sent that occupies both Data Transmission Segment 1 and Data Transmission Segment 2. In some embodiments, other signal codes may be used to request subsequent data transmission opportunities and/or to send information to hub 102, as explained earlier.

Merely by way of example, the transmissions shown in FIG. 9 may be sent as follows. Access node 106 may be associated with Node Identification Segment 7, and access node 108 may be associated with Node Identification Segment 13. In the example of FIG. 9, both Node Identification Segment 7 and Node Identification Segment 13 are occupied by symbol-level identifiers, indicating that access node 106 and access node 108 have each sent a transmission to hub 102. If both transmissions are messages, hub 102 determines if both data transmissions occupy the same data transmission segment to determine if a collision has occurred. If a collision has occurred, hub 102 may assign a subsequent data transmission segment to each access node, as explained previously.

Alternatively, the symbol-level identifiers occupying Node Identification Segment 7 and Node Identification Segment 13 may support transmission of more than two values per symbol. In this case, the signal code may explicitly indicate which data transmission segment is occupied, or the transmission may include only information, rather than a message with a data transmission. In any case, hub 102 determines if a collision has occurred between data transmissions from competing nodes and responds in accordance with the embodiments discussed previously.

The example of FIG. 9 has been provided for illustration purposes only. It is to be understood that any number of data transmission segments may be included in each frame, and symbol level identifiers may be used that support transmission of any number of values.

Multiple Different Data Transmission Segments

Figure 10:
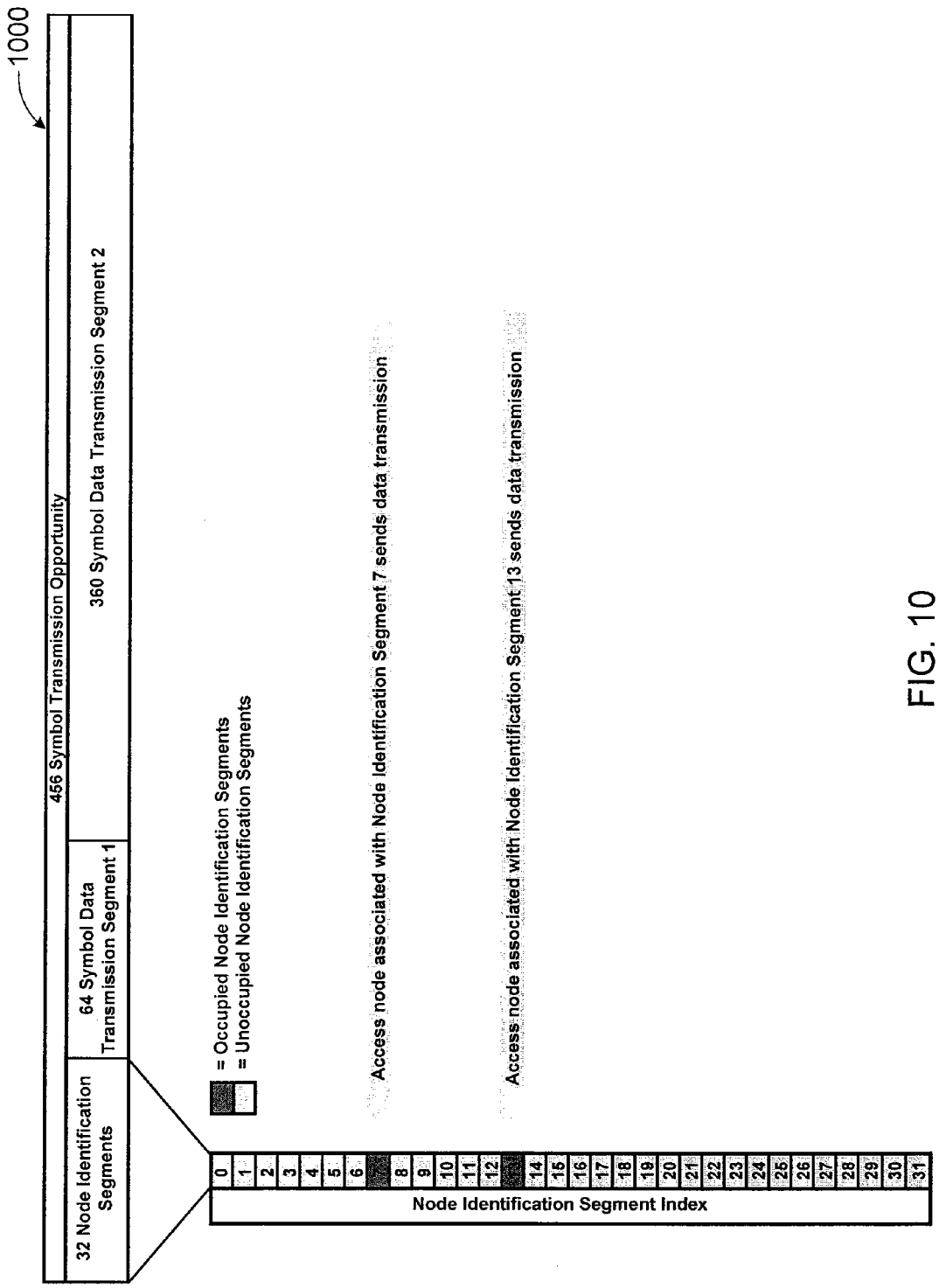
FIG. 10 is an illustrative signal diagram showing a shared communication medium that includes an allocation of node identification signal space with collision-free node identification segments, and an allocation of data transmission signal space with multiple different contention-based data transmission segments, according to an embodiment of the invention.

FIG. 10 is an illustrative signal diagram showing a shared communication medium 1000 that includes an allocation of node identification signal space with collision-free node identification segments, and an allocation of data transmission signal space with multiple different contention-based data transmission segments, according to an embodiment of the invention. In this example, each frame contains two data transmission segments of different sizes.

Shared communication medium 1000 is organized as one continuous sequence of symbols in a single frame, similar to the examples discussed previously. The frame shown in FIG. 10 represents a 456 symbol communication opportunity. The sequence of symbols is arranged in time as follows: node identification segments 0-31 (labeled as Node Identification Segment Indices 0-31) followed by a first 64-symbol data transmission segment (labeled as Data Transmission Segment 1) and a second 360-symbol data transmission segment (labeled as Data Transmission Segment 2). Other frames are structured in a similar manner. The node identification signal space and the data transmission signal space may be organized based on various multiplexing techniques, as discussed previously.

FIG. 10 shows the following types of node identification segments: (1) Occupied Node Identification Segments and (2) Unoccupied Node Identification Segments. Similar to the examples of FIGS. 8 and 9, each node identification segment may be occupied by a symbol-level identifier that supports transmission of more than two values per symbol. Each value may represent a different signal code. Alternatively, each access node may be associated with more than one node identification segment, as illustrated in the example of FIG. 8. Further, in the example of FIG. 10, each frame includes two data transmission segments that are different in size. In this example, a data transmission of up to 64-symbols can be sent in Data Transmission Segment 1, and a data transmission of up to 360-symbols can be sent in Data Transmission Segment 2.

The multiple data transmission segments may be used to reduce the probability of collision between data transmissions from competing nodes, as explained previously. In addition, the data transmission segments may be used to increase the utilization efficiency of the signal space. For example, data transmissions of up to 64 symbols can be sent in Data Transmission Segment 1, while larger data transmissions of up to 360 symbols can be sent in Data Transmission Segment 2. Using a smaller data transmission segment when appropriate can result in more efficient use of the signal space.

In some embodiments, Data Transmission Segment 1 may represent an even smaller payload, for example, of about 4 to 16 symbols or less. Such a compact data transmission segment provides an efficient use of the shared communication medium when utilizing reservations and scheduling of data transmission opportunities. In addition, Data Transmission Segment 2 may represent an even larger payload. According to some embodiments of the invention, an access node may use both data transmission segments to send a data transmission.

In some embodiments, one of the data transmission segments may be utilized on a contention basis, while the other data transmission segment may require a request to reserve a data transmission opportunity, resulting in a collision-free data transmission. In yet another embodiment, both of the data transmission segments may be available on a contention and/or a reservation basis. Here, a symbol-level identifier occupying a node identification segment may be used to send a request to reserve a subsequent data transmission opportunity.

Merely by way of example, the transmissions shown in FIG. 10 may be sent as follows. Access node 106 may be associated with Node Identification Segment 7, and access node 108 may be associated with Node Identification Segment 13. In the example of FIG. 10, both Node Identification Segment 7 and Node Identification Segment 13 are occupied by symbol-level identifiers, indicating that access node 106 and access node 108 have each sent a transmission to hub 102. If both transmissions are messages, hub 102 determines if both data transmissions occupy the same data transmission segment to determine if a collision has occurred. If a collision has occurred, hub 102 may assign a subsequent data transmission segment to each access node, as explained previously.

Alternatively, the symbol-level identifiers occupying Node Identification Segment 7 and Node Identification Segment 13 may support transmission of more than two values per symbol. In this case, the signal code may explicitly indicate which data transmission segment is occupied, or the transmission may include only information, rather than a message with a data transmission. Such information may include a request to reserve a subsequent data transmission opportunity. In any case, hub 102 determines if a collision has occurred between data transmissions from competing nodes and responds in accordance with the embodiments discussed previously.

Multiple Node Identification Segments in Each Frame

Figure 11:
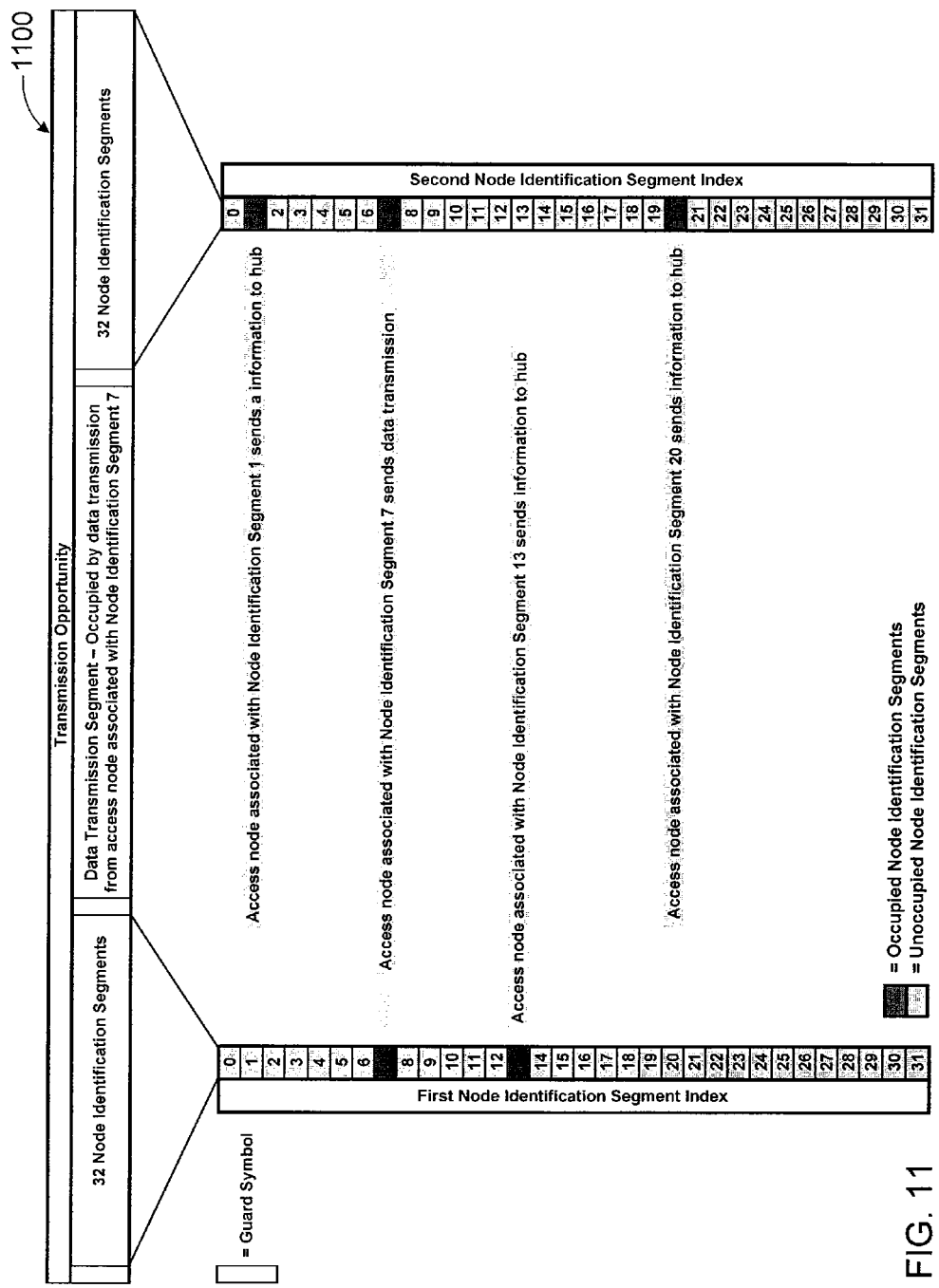
FIG. 11 is an illustrative signal diagram showing a shared communication medium that includes an allocation of node identification signal space and an allocation of data transmission signal space, with collision-free node identification segments before and after each contention-based data transmission segment, according to an embodiment of the invention.

FIG. 11 is an illustrative signal diagram showing a shared communication medium 1100 that includes an allocation of node identification signal space and an allocation of data transmission signal space, with collision-free node identification segments before and after each contention-based data transmission segment, according to an embodiment of the invention. In this example, each access node is associated with a node identification segment, and each frame is organized to include a node identification segment before and after the data transmission segment.

Shared communication medium 1100 is organized as one continuous sequence of symbols in a single frame, similar to the examples discussed previously. The sequence of symbols is arranged in time as follows: first node identification segments 0-31 (labeled as First Node Identification Segment Indices 0-31) followed by a data transmission segment (labeled as Data Transmission Segment), followed by second node identification segments 0-31 (labeled as Second Node Identification Segment Indices 0-31). Other frames are structured in a similar manner. The node identification signal space and the data transmission signal space may be organized based on various multiplexing techniques, as discussed previously.

FIG. 11 shows the following types of node identification segments: (1) Occupied Node Identification Segments and (2) Unoccupied Node Identification Segments. Similar to previous examples, each node identification segment may be occupied by a symbol-level identifier that supports transmission of more than two values per symbol. Each value may represent a different signal code. Alternatively, each access node may be associated with more than one node identification segment.

Additionally, in FIG. 11 it is assumed that the nodes are not sufficiently time-synchronized, such that guard zones are needed to separate the node identification signal space and the data transmission signal space. Because of the imperfect time synchronization, energy from immediately adjacent data transmissions may interfere with and degrade the proper reception and processing of occupied node identification segments. By inserting guard zones, the likelihood of such encroachment is reduced, thereby allowing better performance when messages sent in the same frame are not precisely synchronized in time. Guard zones may also be utilized with any of the previous examples.

In the example of FIG. 11, each frame is organized to include a node identification segment before and after the data transmission segment. Similar to previous examples, associating more than one node identification segment with each access node provides a means whereby access nodes can relay information to hub 102 in a relatively compact format. For example, a symbol-level identifier occupying a first node identification segment may be used to convey information to hub 102. Similarly, a symbol-level identifier occupying a second node identification segment may be used to convey different information to hub 102. Finally, symbol-level identifiers occupying both the first node identification segment and the second node identification segment may be used to indicate that the access node has sent a message to hub 102.

Merely by way of example, the transmissions shown in FIG. 11 may be sent as follows. Access node 104 may be associated with Node Identification Segment 1, access node 106 may be associated with Node Identification Segment 7, access node 108 may be associated with Node Identification Segment 13, and access node 110 may be associated with Node Identification Segment 20. In the example of FIG. 11, Second Node Identification Segment 1 is occupied by a symbol-level identifier, First and Second Node Identification Segments 7 are occupied by symbol-level identifiers, First Node Identification Segment 13 is occupied by a symbol-level identifier, and Second Node Identification Segment 20 is occupied by a symbol-level identifier. This indicates that access node 104 has sent information to hub 102, access node 106 has sent a message to hub 102, access node 108 has sent information to hub 102, and access node 110 has sent information to hub 102. No collision has occurred because only access node 106 has sent a message that includes a data transmission to hub 102. Access nodes 104, 108, and 110 have only sent information to hub 102. Such information may include a request to reserve a subsequent data transmission opportunity or other information. In any case, no collision has occurred.

Figure 12:
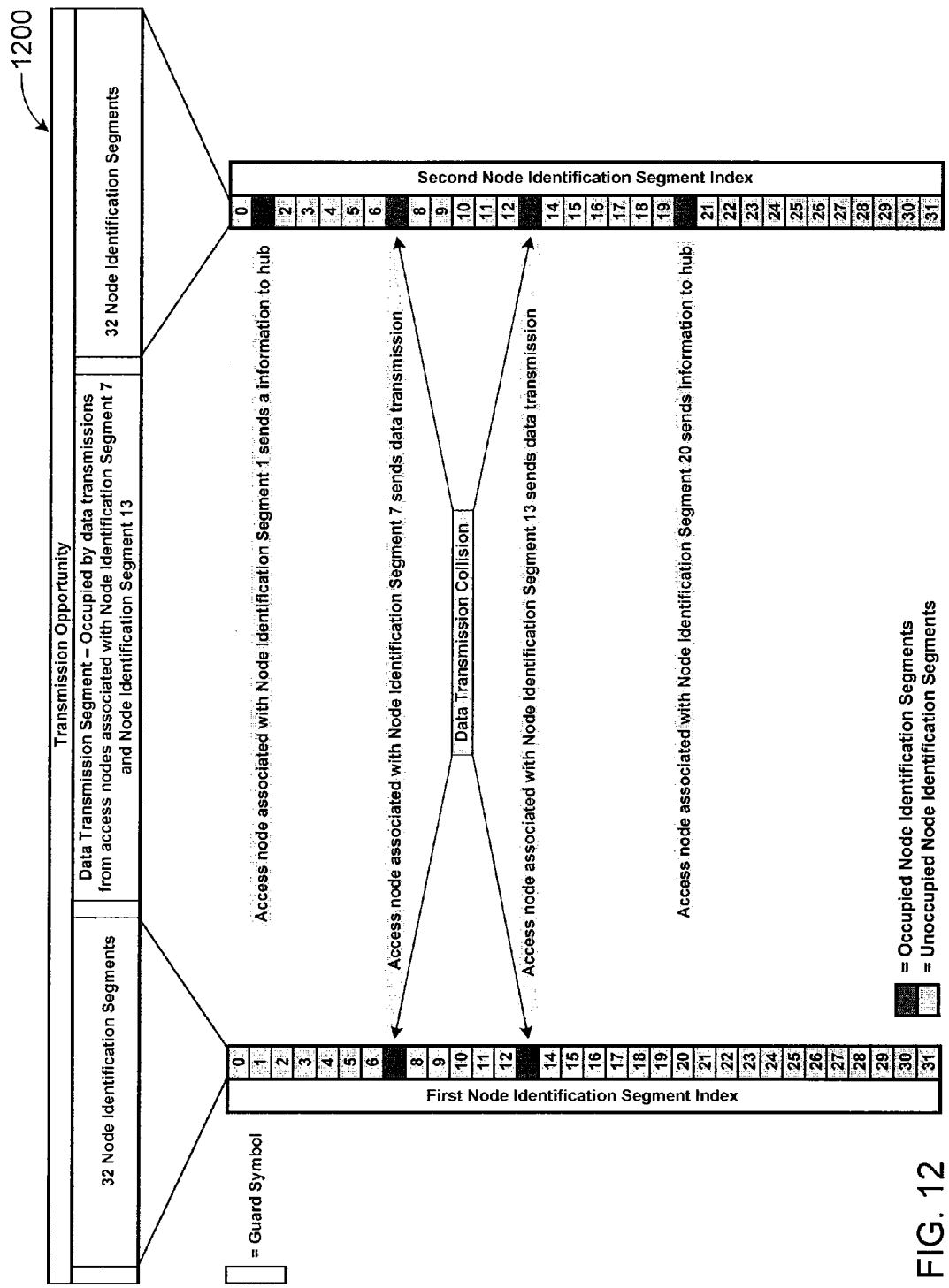
FIG. 12 is an illustrative signal diagram showing a shared communication medium with a collision between data transmissions from competing nodes, according to an embodiment of the invention.

In comparison, FIG. 12 is an illustrative signal diagram showing a shared communication medium 1200 with a collision between data transmissions from competing nodes. Here, like the example of FIG. 11, each of the access nodes 104, 106, 108, and 110 have sent transmissions to hub 102. However, unlike the example of FIG. 11, both access nodes 106 and 108 have sent messages to hub 102, as indicated by First and Second Node Identification Segments 7 being occupied and First and Second Node Identification Segments 13 being occupied. In this case, hub 102 determines that a collision has occurred between the data transmissions from access node 106 and access node 108. Hub 102 assigns different opportunities for subsequent data transmissions to access node 106 and access node 108. Hub 102 sends an assignment message to the access nodes in a feedback signal space (not shown). Upon receiving the assignments, the access nodes can transmit data in the assigned data transmission segments.

While the present invention has been described in terms of specific embodiments, it should be apparent to those skilled in the art that the scope of the present invention is not limited to the specific embodiments described herein. The specification and drawings are, accordingly, to be regarded in an illustrative rather than a restrictive sense. Additionally, the features of one or more embodiments of the invention may be combined with one or more features of other embodiments of the invention without departing from the scope of the invention. It will be evident that additions, subtractions, substitutions, and other modifications may be made without departing from the broader spirit and scope of the invention as set forth in the claims.

What is claimed is:

1. A method for conducting communications involving a plurality of access nodes using a shared communication medium, the method comprising:
sending a message over the shared communication medium from a first access node in the plurality of access nodes, the shared communication medium organized to include an allocation of node identification signal space and an allocation of data transmission signal space, the allocation of node identification signal space including a plurality of contention-free node identification segments each having a different location within the allocation of node identification signal space, each of the plurality of access nodes being associated with a unique one of the plurality of contention-free node identification segments, the allocation of data transmission signal space including a data transmission segment, the data transmission segment available for data transmission from two or more of the plurality of access nodes, the message including a node identification portion and a data transmission portion;
wherein the node identification portion is transmitted in the allocation of node identification signal space, and the node identification portion occupies a contention-free node identification segment that is one of the plurality of contention-free node identification segments;
wherein the data transmission portion is transmitted in the allocation of data transmission signal space, and the data transmission portion occupies the data transmission segment;
wherein a measure of occupancy of the shared communication medium is based on a number of occupied contention-free node identification segments detected in the allocation of node identification signal space; and
wherein, depending on the measure of occupancy of the shared communication medium, the data transmission portion in the allocation of data transmission signal space is processed.

2. The method of claim 1 wherein the allocation of node identification signal space is organized according to a code division multiplexing (CDM) technique using a plurality of code words, and wherein the node identification portion is transmitted using a code word that is one of the plurality of code words.

3. The method of claim 1 wherein if one occupied contention-free node identification segment is detected in the allocation of node identification signal space, the data transmission portion in the allocation of data transmission signal space is processed.

4. The method of claim 1 wherein if two or more occupied contention-free node identification segments are detected in the allocation of node identification signal space, the data transmission portion in the allocation of data transmission signal space is not processed.

5. The method of claim 4 further comprising:
receiving an assignment for re-transmission of the data transmission portion in an assigned data transmission segment in the allocation of data transmission signal space.

6. The method of claim 1 wherein each of the plurality of access nodes are associated with more than one unique contention-free node identification segment in the allocation of node identification signal space.

7. The method of claim 6 wherein a first contention-free node identification segment is located in time prior to the data transmission segment, and a second contention-free node identification segment is located in time after the data transmission segment.

8. The method of claim 1 wherein the node identification portion is a symbol-level identifier that supports transmission of more than two values per symbol.

9. The method of claim 8 wherein a first value is used to request an assigned data transmission segment in the allocation of data transmission signal space.

10. The method of claim 8 wherein a second value is used to send information.

11. The method of claim 1 wherein the allocation of data transmission signal space includes a plurality of data transmission segments.

12. The method of claim 11 wherein a first data transmission segment is different in size than a second data transmission segment.

13. A method for conducting communications involving a plurality of access nodes using a shared communication medium, the method comprising:
receiving a message from a first access node in the plurality of access nodes over the shared communication medium, the shared communication medium organized to include an allocation of node identification signal space and an allocation of data transmission signal space, the allocation of node identification signal space including a plurality of contention-free node identification segments each having a different location within the allocation of node identification signal space, each of the plurality of access nodes being associated with a unique one of the plurality of contention-free node identification segments, the allocation of data transmission signal space including a data transmission segment, the data transmission segment available for data transmission from two or more of the plurality of access nodes, the message including a node identification portion and a data transmission portion;
wherein the node identification portion is transmitted in the allocation of node identification signal space, and the node identification portion occupies a contention-free node identification segment that is one of the plurality of contention-free node identification segments;
wherein the data transmission portion is transmitted in the allocation of data transmission signal space, and the data transmission portion occupies the data transmission segment;
determining a measure of occupancy of the shared communication medium based on a number of occupied contention-free node identification segments detected in the allocation of node identification signal space; and
depending on the measure of occupancy of the shared communication medium, processing the data transmission portion in the allocation of data transmission signal space.

14. An apparatus for conducting communications involving a plurality of access nodes using a shared communication medium, comprising:
a first access node in the plurality of access nodes configured to send a message over the shared communication medium, the shared communication medium organized to include an allocation of node identification signal space and an allocation of data transmission signal space, the allocation of node identification signal space including a plurality of contention-free node identification segments each having a different location within the allocation of node identification signal space, each of the plurality of access nodes being associated with a unique one of the plurality of contention-free node identification segments, the allocation of data transmission signal space including a data transmission segment, the data transmission segment available for data transmission from two or more of the plurality of access nodes, the message including a node identification portion and a data transmission portion;
wherein the node identification portion is transmitted in the allocation of node identification signal space, and the node identification portion occupies a contention-free node identification segment that is one of the plurality of contention-free node identification segments;
wherein the data transmission portion is transmitted in the allocation of data transmission signal space, and the data transmission portion occupies the data transmission segment;
wherein a measure of occupancy of the shared communication medium is based on a number of occupied contention-free node identification segments detected in the allocation of node identification signal space; and
wherein, depending on the measure of occupancy of the shared communication medium, the data transmission portion in the allocation of data transmission signal space is processed.

15. The apparatus of claim 14 wherein the allocation of node identification signal space is organized according to a code division multiplexing (CDM) technique using a plurality of code words, and wherein the node identification portion is transmitted using a code word that is one of the plurality of code words.

16. The apparatus of claim 14 wherein if one occupied contention-free node identification segment is detected in the allocation of node identification signal space, the data transmission portion in the allocation of data transmission signal space is processed.

17. The apparatus of claim 14 wherein if two or more occupied contention-free node identification segments are detected in the allocation of node identification signal space, the data transmission portion in the allocation of data transmission signal space is not processed.

18. The apparatus of claim 17 wherein the access node is configured to receive an assignment for re-transmission of the data transmission portion in an assigned data transmission segment in the allocation of data transmission signal space.

19. The apparatus of claim 14 wherein each of the plurality of access nodes are associated with more than one unique contention-free node identification segment in the allocation of node identification signal space.

20. The apparatus of claim 19 wherein a first contention-free node identification segment is located in time prior to the data transmission segment, and a second contention-free node identification segment is located in time after the data transmission segment.

21. The apparatus of claim 14 wherein the node identification portion is a symbol-level identifier that supports transmission of more than two values per symbol.

22. The apparatus of claim 21 wherein a first value is used to request an assigned data transmission segment in the allocation of data transmission signal space.

23. The apparatus of claim 21 wherein a second value is used to send information.

24. The apparatus of claim 14 wherein the allocation of data transmission signal space includes a plurality of data transmission segments.

25. The apparatus of claim 24 wherein a first data transmission segment is different in size than a second data transmission segment.

26. An apparatus for conducting communications using a shared communication medium involving a plurality of access nodes, comprising:
   a second access node configured to receive a message from a first access node over the shared communication medium, the shared communication medium organized to include an allocation of node identification signal space and an allocation of data transmission signal space, the allocation of node identification signal space including a plurality of contention-free node identification segments each having a different location within the allocation of node identification signal space, each of the plurality of access nodes being associated with a unique one of the plurality of contention-free node identification segments, the allocation of data transmission signal space including a data transmission segment, the data transmission segment available for data transmission from two or more of the plurality of access nodes, the message including a node identification portion and a data transmission portion;
   wherein the node identification portion is transmitted in the allocation of node identification signal space, and the node identification portion occupies a contention-free node identification segment that is one of the plurality of contention-free node identification segments;
   wherein the data transmission portion is transmitted in the allocation of data transmission signal space, and the data transmission portion occupies the data transmission segment;
   wherein the second node is configured to determine a measure of occupancy of the shared communication medium based on a number of occupied contention-free node identification segments detected in the allocation of node identification signal space; and
   wherein the second access node is configured to process the data transmission portion in the allocation of data transmission signal space depending on the measure of occupancy of the shared communication medium.

* * * * *